(12) United States Patent
Petela et al.

(10) Patent No.: US 7,638,559 B2
(45) Date of Patent: Dec. 29, 2009

(54) EXPANDABLE RESINS

(75) Inventors: Grazyna Petela, Calgary (CA); Michel Florentine Jozef Berghmans, Calgary (CA); Karel Cornelis Bleijenberg, Presto, PA (US)

(73) Assignee: NOVA Chemicals Inc., Moon Township, PA (US)

(*) Notice: Subject to any disclaimer, the term of this patent is extended or adjusted under 35 U.S.C. 154(b) by 714 days.

(21) Appl. No.: 11/430,797

(22) Filed: May 9, 2006

(65) Prior Publication Data

US 2006/0276558 A1 Dec. 7, 2006

Related U.S. Application Data

(60) Provisional application No. 60/679,468, filed on May 10, 2005.

(51) Int. Cl.
- *C08J 9/16* (2006.01)
- *C08J 9/00* (2006.01)
- *C08L 9/02* (2006.01)
- *C08L 25/02* (2006.01)

(52) U.S. Cl. .............. 521/59; 521/56; 521/57; 525/191; 525/232; 525/233; 525/241; 428/402

(58) Field of Classification Search ............ 428/402.21, 428/402; 521/56, 57, 59; 525/191, 232, 525/233, 241
See application file for complete search history.

(56) References Cited

U.S. PATENT DOCUMENTS

| | | | |
|---|---|---|---|
| 2,661,339 A * | 12/1953 | Sparks et al. ............... | 525/237 |
| 3,023,175 A | 2/1962 | Rodman, Jr. | |
| 3,879,496 A * | 4/1975 | Paxton ....................... | 525/193 |
| 3,959,189 A | 5/1976 | Kitamori | |
| 4,144,204 A | 3/1979 | Mittnacht et al. | |
| 4,303,756 A | 12/1981 | Kajimura et al. | |
| 4,303,757 A | 12/1981 | Kajimura et al. | |
| 4,429,059 A | 1/1984 | Ozutsumi et al. | |
| 4,433,029 A | 2/1984 | Senda et al. | |
| 4,582,859 A | 4/1986 | Lein, Jr. et al. | |
| 4,622,347 A | 11/1986 | Fudge | |
| 4,647,593 A | 3/1987 | Bartosiak et al. | |
| 4,666,946 A | 5/1987 | Fudge | |
| 4,677,134 A | 6/1987 | Fudge | |
| 4,692,471 A | 9/1987 | Fudge | |
| 4,777,210 A | 10/1988 | Sosa et al. | |
| 4,781,983 A | 11/1988 | Stickley | |
| 4,782,098 A | 11/1988 | Allen et al. | |
| 5,084,513 A | 1/1992 | Zijderveld et al. | |
| 5,130,340 A | 7/1992 | Allen et al. | |
| 5,525,636 A | 6/1996 | Henn et al. | |
| 5,837,740 A * | 11/1998 | Haraguchi et al. ............ | 521/60 |
| 6,080,796 A | 6/2000 | Liebert | |
| 6,127,439 A | 10/2000 | Berghmans et al. | |
| 6,153,307 A | 11/2000 | Baran | |
| 6,160,027 A | 12/2000 | Crevecoeur et al. | |
| 6,176,439 B1 | 1/2001 | Masison | |
| 6,242,540 B1 | 6/2001 | Crevecoeur et al. | |
| 6,610,798 B1 | 8/2003 | Bleijenberg et al. | |
| 6,727,328 B1 | 4/2004 | Bleijenberg et al. | |
| 6,747,107 B2 | 6/2004 | Petela et al. | |
| 6,908,949 B2 | 6/2005 | Arch et al. | |
| 6,943,223 B1 | 9/2005 | Bleijenberg et al. | |

FOREIGN PATENT DOCUMENTS

| | | |
|---|---|---|
| GB | 1 409 285 | 12/1972 |
| GB | 2 153 370 A | 12/1984 |
| WO | WO 98/01489 | 7/1996 |
| WO | WO 03037977 A2 * | 5/2003 |

OTHER PUBLICATIONS

Zhou et al, Journal of Applied Polymer Science vol. 91, pp. 2072-2078, published onlined Dec. 2003.*

* cited by examiner

*Primary Examiner*—Irina S Zemel
*Assistant Examiner*—Jeffrey Lenihan
(74) *Attorney, Agent, or Firm*—Gary F. Matz

(57) ABSTRACT

Resin beads having an average particle size of from 0.001 mm to 10 mm and containing a continuous phase and a particulate dispersed phase are described. The continuous phase includes elastomeric polymers; the dispersed phase includes homopolymers and/or copolymers containing repeat units resulting from the polymerization of one or more aryl polymerizable monomers. The unexpanded polymer resin beads can be prepared by dispersing an organic phase containing elastomeric polymers and one or more monomers, into droplets and polymerizing the monomers in the organic droplets in a low shear flow pattern. The beads can be impregnated with blowing agents, expanded and can be used to make molded articles. Resin beads having a continuous phase comprising a nitrile rubber, and a dispersed phase comprising one or more homopolymers and/or copolymers containing repeat units resulting form the polymerization of one or more aryl polymerizable show prolonged retention of blowing agents in unexpanded form.

20 Claims, 8 Drawing Sheets

RPM=135

RPM=280

RPM=600

EXPANDABLE RESINS

REFERENCE TO RELATED APPLICATION

This application claims the benefit of priority of U.S. Provisional Application Ser. No. 60/679,468 filed May 10, 2005 entitled "Expandable Resins" which are all herein incorporated by reference in their entirety.

BACKGROUND OF THE INVENTION

1. Field of the Invention

The present invention relates to expandable thermoplastic resin beads and in particular to expandable resins having good toughness and cushioning properties, good retention of blowing agents and the resulting foamed articles made from such resins.

2. Description of the Prior Art

Generally, it is easy to obtain polystyrene beads having a high expansion ratio. The resulting foamed articles made from such beads have high rigidity and good shape retention, but have the disadvantage in that they are fragile and have poor chemical resistance, oil resistance and thermal stability. Foamed products of polypropylene resin, on the other hand, have better elasticity, chemical resistance, oil resistance and thermal stability than polystyrene foams. A blowing agent impregnated in polypropylene resin beads tends to dissipate rapidly, and it is necessary, therefore, to pre-foam them rapidly after preparation to obtain expanded beads, or to store these expandable resin beads in a container under pressure. Accordingly, such impregnated polypropylene resin beads have disadvantages during storage and transportation and it is generally difficult to obtain polypropylene expandable beads having a high expansion ratio.

When polypropylene and polystyrene are simply mixed in an attempt to obtain a resin having the desirable characteristics of both polymers, a uniform mixture cannot be obtained. A foamed product prepared from such a mixture undergoes phase separation, and does not have an attractive appearance. In many cases the amount of the polyolefin mixed is small, because when the vinyl aromatic polymer is simply physically mixed with the polyolefin, the two resins do not become uniformly mixed and phase separation occurs. As a result, the impregnation of the blowing agent and the expansion ratio become non-uniform, and a uniform foamed article cannot be obtained. Moreover, because of the low polyolefin content, the toughness and elasticity of the resulting foamed product cannot be improved.

It is known to polymerize a vinyl aromatic monomer, such as styrene, within polyethylene particles. U.S. Pat. No. 3,959,189 discloses a process for producing polyethylene resin particles which comprises suspending in an aqueous medium polyethylene resin particles, adding to the suspension 30 to 100% by weight based on the weight of the particles of a styrene monomer and an initiator for polymerizing the monomer, and polymerizing the monomer inside the polyethylene resin particles. The particles can then be made foamable by impregnating them with a blowing agent, preferably after the polymerization of the styrene monomer and the cross-linking of the polyethylene resin. The blowing agent generally is a volatile blowing agent, i.e. aliphatic hydrocarbons such as n-propane, n-butane, iso-butane, n-pentane, iso-pentane, n-hexane and neopentane; or cycloaliphatic hydrocarbons such as cyclobutane and cyclopentane; and halogenated hydrocarbons such as methyl chloride, ethyl chloride, methylene chloride, trichlorofluoromethane, dichlorofluoromethane, dichlorodifluormethane, chlorodifluoromethane and dichlorotetrafluoroethane, etc. in an amount between 5 to 20% by weight based on the weight of the polyethylene-polystyrene resin particles.

U.S. Pat. No. 4,782,098 discloses foamable interpolymer beads comprising polyphenylene ether resin and a polymerized vinyl aromatic monomer that is polymerized in the presence of a polymerization catalyst to form interpolymerized thermoplastic resin beads. A volatile blowing agent is introduced under pressure into the thermoplastic resin beads.

U.S. Pat. Nos. 4,303,756 and 4,303,757 disclose a process for producing expandable thermoplastic resin beads where a vinyl aromatic monomer is polymerized onto the backbone of the polypropylene; and introducing a blowing agent into the thermoplastic resin beads. The blowing agent is the same as that taught in U.S. Pat. No. 4,782,098.

U.S. Pat. No. 4,429,059 discloses a process for producing foamable polyolefin particles comprising adding a mixture of 3 to 15 parts by weight of a blowing agent and 0.5 to 5 parts by weight of a blowing aid to 100 parts by weight of polyolefin particles. Column 2, lines 63-66, teach that the blowing aid causes the interior of the particles to be in a plastic state to facilitate the foaming of the particles. Representative blowing aids used as a plasticizer are benzene, toluene, xylene, trichlene, perchlene, cyclohexane, carbon tetrachloride, etc.

Similarly, interpolymers of polyolefins and polymers of vinyl aromatic monomers that can be expanded to form foamed articles are disclosed in U.S. Pat. Nos. 4,303,756, 4,303,757, 4,622,347, 4,647,593, 4,692,471, 4,677,134, and 4,666,946 and U.S. Application Publication 2004/0152795.

Although interpolymers of polyolefins and polymers of vinyl aromatic monomers can be expanded to form a material characterized as having good toughness and cushioning properties, the cost of such materials limits their commercial utility.

It is also known that rubber-reinforced polymers of monovinylaromatic compounds, such as styrene, alphamethyl styrene and ring substituted styrenes are desirable for a variety of uses. More particularly, rubber reinforced polymers of styrene having included therein discrete particles of a rubber, for example, polybutadiene, the discrete particles of rubber being dispersed throughout the styrene polymer matrix, can be used in a variety of applications including refrigerator linings, packaging applications, furniture, household appliances and toys. The conventional term for such rubber reinforced polymers is "High Impact Polystyrene" or "HIPS". The physical characteristics and mechanical properties of HIPS are dependent upon many factors, including the particle size and amount of cross-linking in the rubber particles.

U.S. Pat. No. 4,777,210 discloses a continuous flow process for producing high impact polystyrene and for providing reliable and reproducible methods for varying particle sizes. According to this process, a pre-inversion reactor is utilized to convert a solution of styrene, polystyrene, rubber (such as polybutadiene) and a peroxide catalyst into a high impact polystyrene material.

U.S. Pat. No. 4,144,204 discloses a monovinylaromatic compound modified with rubber where the amount of rubber dissolved in the monomer prior to polymerization was chosen so that the content of the soft component (gel phase) in the impact resistance polymer was at least 28% by weight based on the weight of the impact resistant polymer.

GB 2,153,370 discloses a HIPS material manufactured utilizing a high molecular weight rubber material having a stated molecular mass of at least 300,000, a viscosity greater than or equal to 140 cps; the resulting HIPS containing between 7 and 10% by weight of rubber, and the polymerization being carried out in the presence of alphamethyl styrene dimer or a compound chosen from n-dodecylmercaptan, tertiarydodecylmercaptan, diphenyl 1,3 butadiene, or various other compounds or mixtures thereof. Also, this process was carried out in the presence of cyclohexane and ethylbenzene equal to at least 7% by weight of the total ingredients. In addition, additives including monotriglycerides of stearates from polyethylene waxes were also necessary.

U.S. Pat. No. 5,084,513 discloses a process for the manufacture of stable interpenetrating polymer blend networks that includes the preparation of a gel of a poly(alkylene) polymer by dissolving it in a mixture of one or more organic solvents and one or more vinyl aromatic monomers and subsequently polymerizing the mixture.

Typically, HIPS type materials are less expensive than interpolymers of polyolefins and polymers of vinyl aromatic monomers and have good impact resistance but can be brittle and/or lack toughness and generally can not be expanded to provide articles having the desirable physical properties obtained with interpolymers of polyolefins and polymers of vinyl aromatic monomers.

Thus, there is a need in the art for materials containing elastomeric or rubber type materials and polymers of monovinylaromatic monomers that can be expanded to form articles having toughness and cushioning properties approaching those obtainable using interpolymers of polyolefins and polymers of vinyl aromatic monomers.

SUMMARY OF THE INVENTION

The present invention provides an unexpanded resin bead having an average particle size of from 0.001 mm to 10 mm and containing a continuous phase and a particulate dispersed phase. The continuous phase includes one or more elastomeric polymers. The dispersed phase includes one or more homopolymers and/or copolymers containing repeat units resulting from the polymerization of one or more aryl polymerizable monomers.

The present invention provides a method of making the above described resin beads, that comprises:
I) forming a dispersion of organic droplets of an organic liquid phase in an aqueous phase, which can be stationary or flowing, wherein the organic phase contains an organic solution containing one or more elastomeric polymers dissolved in a monomer solution that includes one or more aryl polymerizable monomers, the organic droplets having an average diameter of from about 0.001 mm to about 10 mm, and
II) polymerizing the monomers in the organic droplets in a low shear flow pattern.

The present invention further provides molded articles that contain any of the above-described resin beads.

DETAILED DESCRIPTION OF THE INVENTION

Figure 1A:
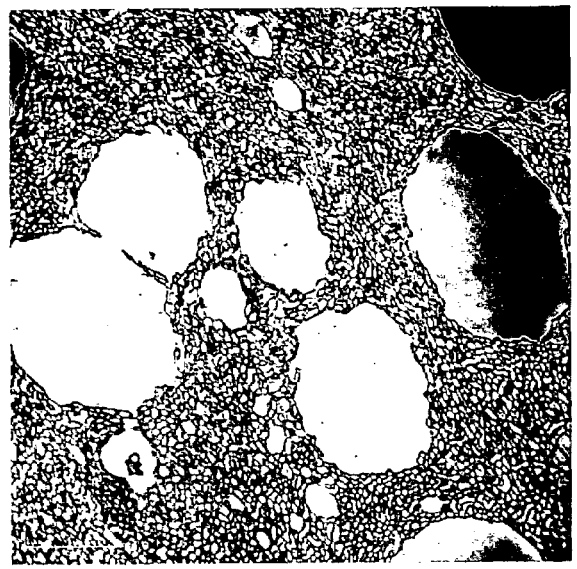
FIG. 1A is a transmission electron microscope (TEM) image of a resin bead according to the invention.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the terms "(meth)acrylic," "(meth)acrylate" and "(meth)acrylonitrile are meant to include both acrylic and methacrylic acid derivatives, such as the corresponding alkyl esters often referred to as acrylates and (meth)acrylates, and acrylonitrile and (meth)acrylonitrile, which the terms "(meth)acrylate" and "(meth)acrylonitrile" respectively are meant to encompass.

As used herein, the term "polymer" is meant to encompass, without limitation, homopolymers, copolymers, graft copolymers, and blends and combinations thereof.

Unless otherwise specified, all molecular weight values are determined using gel permeation chromatography (GPC) using appropriate polystyrene standards. Unless otherwise indicated, the molecular weight values indicated herein are weight average molecular weights (Mw).

As used herein, the term "elastomeric polymer" refers to a natural or synthetic polymer, rubber, or rubberoid material, which has the ability to undergo deformation under the influence of a force and regain its original shape once the force has been removed.

As used herein, the term "morphology" refers to the microstructural features, such as size, shape, chain arrangement and character of the domains occupied by the elastomeric polymers in the continuous phase and the homopolymers and/or copolymers in the dispersed phase and their relative spatial arrangement with one another.

As used herein, the term "crosslinked web morphology" refers to a microstructural bead morphology where the domains of the elastomeric polymers in the continuous phase are arranged in a three-dimensional network structure of horizontal, vertical, circumferential, tangential, and/or angular threads in a web-like structure, where a majority of the threads in the network are crosslinked and/or knitted together with one another, at least some of which are crosslinked by or at discrete particulate domains of the dispersed phase, which exists as discrete particles dispersed throughout the network structure.

As used herein, the term "web-like structure" refers to any connected series of threads that make up a framework in a resin bead.

As used herein, the phrase "morphology comprising threads having a large aspect ratio, which are optionally at least partially crosslinked and/or connected via locally formed branches and/or an interconnected mesh structure" refers to a microstructural bead morphology where the elastomeric polymers in the continuous phase exist as individual threadlike domains having a large aspect ratio, as a non-limiting example of greater than 100, where optionally some, but not a majority of the domains are crosslinked with one another and the dispersed phase exists as discrete particulate domains dispersed and commingled throughout the threadlike domains of the continuous phase. This morphology is distinguished from the crosslinked web morphology in that there is substantially less crosslinking and framework structure between the threadlike domains of the continuous phase.

As used herein, the terms "bead", "resin bead", "unexpanded resin bead" and "unexpanded particle" refer to resin beads having any of the above-described morphologies that have substantially the same size and shape and are formed from the organic droplets just after polymerization of the monomers in the droplets is completed.

As used herein, the terms "expanded resin bead" and "expanded particle" refer to resin beads and/or particles that have been impregnated with a blowing agent, at least some of which is subsequently removed (as a non-limiting example heated and expanded followed by evaporation and diffusion out of the bead) in a way that increases the volume of the resin beads and/or particles and accordingly decreases their bulk density.

In its broadest sense, the term "low shear flow pattern" refers to a method of maintaining movement and flow of dispersed organic droplets in an aqueous continuous phase such that the shear stress, which the droplets are subjected to during their movement, does not substantially deform or change the shape of the droplets. In particular embodiments, the term "low shear flow pattern" refers to a method of maintaining movement and flow of dispersed organic droplets in an aqueous continuous phase such that the shear stress which the droplets are subjected to during their movement, is sufficiently low, such that a phase inversion does not occur in the organic phase. By the phrase "a phase inversion does not occur in the organic phase" it is meant that the resulting resin beads will have a continuous phase comprising one or more elastomeric polymers and a dispersed phase comprising one or more homopolymers and/or copolymers containing repeat units resulting from the polymerization of one or more aryl polymerizable monomomers, optionally with one or more non-aryl monomers.

As used herein, the term "crosslinked polymers" refers to two or more polymer chains (on a molecular level) that are attached to one another. Low levels of crosslinking in a polymer composition (as a non-limiting example, less than 5%) are referred to herein as branched polymers. High levels of crosslinking in a polymer composition (as a non-limiting example greater than 25%) are referred to herein as network structures.

The present invention is directed to an unexpanded resin bead containing a continuous phase and a particulate dispersed phase.

The unexpanded resin bead can have any suitable shape, non-limiting examples being cross-sectional shapes that are circular, oval, elliptical, and/or cylindrical. In an embodiment of the invention, the beads are substantially spherical (circular or elliptical in cross-section) in shape.

In an embodiment of the invention, the aspect ratio of the unexpanded resin beads is less than 10, in some cases less than 7, and in other cases less than 5.

The unexpanded resin bead can have an average particle size of at least 0.001, in some cases at least 0.01, in other cases at least 0.05 and in some instances at least 0.1 mm. Further, the unexpanded bead particle size can be up to 10, in some cases up to 9, in other cases up to 8, in some instances up to 7, in other instances up to 6, and in some situations up to 4 mm. The size of the unexpanded resin bead is determined based on processing conditions as well as the properties desired in foamed articles that the unexpanded bead will be used to produce.

The average bead size can be determined by a conventional mechanical separation method, well known in the art as screening, where a bead sample passes through the set of sieves with standardized and decreasing openings, so the sample mass fractions with the sizes corresponding to the respective sieve openings are determined.

In an alternative method, the average bead size can be determined by photographing a sample of beads taken from a given population of beads and analyzing the photographic image using software known in the art that is capable of sizing the diameter of each bead in the image. Using the set of diameters obtained from any of the above methods, the average diameter for the sample, standard deviation and the sample size distribution can be calculated. The average size of the unexpanded resin beads can be any value or can range between any of the values recited above.

The present resin beads include a continuous phase that includes one or more elastomeric polymers. Any suitable elastomeric polymer can be used in the present invention. Suitable elastomeric polymers are those that allow for obtaining the desirable properties described below.

In an embodiment of the invention, suitable elastomeric polymers include homopolymers of butadiene or isoprene, and random, block, AB diblock, or ABA triblock copolymers of a conjugated diene with an aryl monomer and/or (meth) acrylonitrile, and random, alternating or block copolymers of ethylene and vinyl acetate, and combinations thereof.

As used herein, the term "conjugated diene" refers to a linear, branched or cyclic hydrocarbon containing from 4 to 32 carbon atoms, and optionally hetero atoms selected from O, S, or N, which contain two double bonds separated by one single bond in a structure where the two double bonds are not part of an aromatic group.

In a particular embodiment of the invention, the elastomeric polymers include one or more block copolymers selected from diblock and triblock copolymers of styrene-butadiene, styrene-butadiene-styrene, styrene-isoprene, styrene-isoprene-styrene, partially hydrogenated styrene-isoprene-styrene, ethylene-vinylacetate and combinations thereof.

In another particular embodiment of the invention, suitable elastomeric polymers include copolymers of one or more conjugated dienes such as but not limited to butadiene, isoprene (i.e. 2-methyl-1,3-butadiene), 3-butadiene, 2,3-dimethyl-1,3-butadiene and 1,3-pentadiene, one or more of a suitable unsaturated nitrile such as acrylonitrile or methacrylonitiles and optionally one or more of a polar monomer such as acrylic acid, methacrylic acid, itaconic acid and maleic acid, alkyl esters of unsaturated carboxylic acids such as methyl acrylate and butyl acrylate; alkoxyalkyl esters of unsaturated carboxylic acids such as methoxy acrylate, ethoxyethyl acrylate, methoxyethyl acrylate, acrylamide, methacrylamide; N-substituted acrylamides such as N-methylolacrylamide, N,N'-dimethylolacrylamide and N-ethoxymethylolacrylamide; N-substituted methacrylamides such as N-methylolmethacrylamide, N,N'-dimethylolmethacrylamide, N-ethoxymethylmethacrylamide and vinyl chloride. These copolymers may also comprise repeat units from the polymerization of one or more aromatic vinyl monomers such as but not limited to styrene, 0-, m-, p-methyl styrene, dimethylstyrene and ethyl styrene. These types of copolymers are known as "acrylonitrile-butadiene rubbers" or "acrylonitrile-butadiene-styrene rubbers" or collectively as "nitrile rubbers" by those skilled in the art.

In some embodiments of the current invention, the nitrile rubbers can be partially hydrogenated in the presence of hydrogen, preferably with a suitable hydrogenation catalyst. Suitable hydrogenation catalysts are well known in the art and include but are not limited to rhodium and ruthenium catalysts. By "partially hydrogenated" it is meant that hydrogenation is carried out selectively, wherein the carbon-carbon double bonds of the nitrile rubber are hydrogenated preferentially over the carbon-nitrogen triple bonds of the nitrile groups, which remain largely intact. In the phrase "remain largely intact" it is meant that less than 10%, in some cases less than 5%, in other cases less than 2% of the nitrile groups originally present in the nitrile rubber are hydrogenated. The hydrogenation of nitrile rubbers can be controlled to give polymers of varying degrees of hydrogenation. The degree of carbon-carbon double bond hydrogenation can be determined using IR or NMR spectroscopy, methods which are well known to those skilled in the art.

In embodiments of the current invention, use of "nitrile rubber" in the continuous phase in the inventive resin beads, leads to prolonged retention of a blowing agent, a non-limiting example being pentane, at room temperature and pressure.

In an embodiment of the invention, the weight average molecular weight of the elastomeric polymers is at least 6,000, in some cases at least 10,000, in other cases at least 15,000, in some instances at least 20,000 and in other cases at least 25,000. Also, the weight average molecular weight of the elastomeric polymers can be up to 500,000, in some cases up to 450,000, in other cases up to 400,000, in some instances up to 350,000, in other instances up to 300,000, and in particular instances up to 250,000. The weight average molecular weight of the elastomeric polymers used is determined based on the physical properties desired in the bead. The weight average molecular weight of the elastomeric polymers can be any value or range between any of the values recited above.

In an embodiment of the invention, the elastomeric polymers in the unexpanded resin bead may be crosslinked. The elastomeric polymers may be crosslinked during or after (but not before) homo- or co-polymerization of the one or more aryl and/or non-aryl polymerizable monomers described below. In this embodiment, the elastomeric polymers are crosslinked to the extent necessary to provide desired physical properties. In an embodiment, the elastomeric polymers contain low levels of crosslinking.

The present resin beads include a dispersed phase that includes one or more homopolymers and/or copolymers containing repeat units resulting from the polymerization of one or more aryl polymerizable monomers.

As used herein, the term "aryl polymerizable monomers" or "aryl monomers" refers to molecules that contain a non-aromatic unsaturated hydrocarbon group containing from 2 to 12 carbon atoms and a group obtained by removing a hydrogen atom from an aromatic compound that contains form 6 to 24 carbon atoms.

In an embodiment of the invention, the aryl monomers include one or more of styrene, p-methyl styrene, α-methyl styrene, tertiary butyl styrene, dimethyl styrene, nuclear brominated or chlorinated derivatives thereof and combinations thereof.

In another embodiment of the invention, the dispersed phase contains copolymers of aryl monomers, optionally with one or more non-aryl monomers. Any suitable non-aryl monomer can be used in the invention. Suitable non-aryl co-monomers include, but are not limited to maleic anhydride, maleic acid, maleimide, fumaric acid, $C_1$-$C_{12}$ linear, branched or cyclic alkyl esters of maleic acid, $C_1$-$C_{12}$ linear, branched or cyclic alkyl esters of fumaric acid, itaconic acid, $C_1$-$C_{12}$ linear, branched or cyclic alkyl esters of itaconic acid, itaconic anhydride, ethylene, propylene, 1-butene, isobutylene, 2-butene, diisobutylene, 1-pentene, 2-pentene, 1-hexene, 2-hexene, 3-hexene, vinyl acetate, $C_1$-$C_{12}$ linear, branched or cyclic alkyl esters of (meth)acrylic acid, acrylonitrile, methacrylonitrile, di- or higher functional monomers, non-limiting examples of such being divinyl benzene and conjugated dienes, and combinations thereof.

In an embodiment of the invention, the homopolymers and/or copolymers of aryl monomers in the unexpanded resin beads can be crosslinked. In this embodiment, the homopolymers and/or copolymers are crosslinked to the extent necessary to provide desired physical properties. In an embodiment, the homopolymers and/or copolymers polymers contain low levels of crosslinking.

In an embodiment of the invention, the weight average molecular weight of the homopolymers and/or copolymers in the dispersed phase is at least 10,000, in some cases at least 15,000, in other cases at least 20,000, in some instances at least 25,000, in other instances at least 30,000, and in some circumstances at least 35,000 and can be up to 1,000,000, in some cases up to 750,000, in other cases up to 600,000, in some instances up to 500,000, and in other instances up to 250,000. The molecular weight of the homopolymers and/or copolymers in the dispersed phase will depend on the polymerization conditions used and the physical properties desired in the resulting bead. The molecular weight of the homopolymers and/or copolymers in the dispersed phase can be any value or can range between any of the values recited above.

Generally, "aryl monomers" or "non-aryl monomers", also designated herein simply as "monomers" are converted into homopolymers and/or copolymers to a substantially high degree in the dispersed phase. As such, the amount of unreacted monomers in the resin bead can be less than 5, in some cases less than 4, and in other cases less than 2.5 wt. % based on the weight of the resin bead.

In an embodiment of the invention, at least some of the monomers are grafted onto at least some of the elastomeric polymers in the continuous phase.

In another embodiment of the invention, a portion of the homopolymers and/or copolymers of aryl monomers are present in the continuous phase. In this embodiment, the amount of homopolymers and/or copolymers present in the continuous phase is at least 0.01, in some cases at least 0.1, and in other cases at least 1 wt. % and can be up to 50, in some cases up to 40, in other cases up to 30, in some instance up to 20, in other instances up to 10 and in certain circumstances up to 5 wt. % of the total homopolymers and/or copolymers of aryl monomers present in the resin bead. The amount of homopolymers and/or copolymers of aryl monomers present in the continuous phase will depend on the type of processing used to prepare the resin bead. The amount of homopolymers and/or copolymers of aryl monomers in the continuous phase of the resin bead can be any value or can range between any of the values recited above.

In an embodiment of the invention, the resin bead can include a skin over substantially all of its outer surface. The skin can be at least 0.1, in some cases at least 0.25, in other cases at least 0.5, in some instances at least 1, in other instances at least 1.5, and in some circumstances at least 2 μm thick. Additionally, the skin can be up to 7, in some cases up to 6, and in other cases up to 5 μm thick. The skin thickness is limited by the skin volume as recited below. The thickness of the resin bead skin can be any value or can range between any of the values recited above.

The resin bead skin occupies only a portion of the resin bead volume. As such, the skin can make up at least 1, in some cases at least 2.5, and in other cases at least 5 volume percent of the resin bead. Also, the skin can constitute up to 25, in some cases up to 20, in other cases up to 15, and in some instances up to 10 volume percent of the resin bead. The volume of the resin bead constituting the resin bead skin can be any value or can range between any of the values recited above.

In an embodiment of the invention, the resin bead skin comprises the homopolymers and/or copolymers of the dispersed phase as described above.

In an embodiment of the invention, the present resin beads do not melt or decompose when exposed to a temperature of 225° C., in some cases 200°, and in other cases 175° C. for 10 minutes.

The unexpanded resin beads according to the invention can be prepared by
A) forming a dispersion of organic droplets, that contains one or more elastomeric polymers dissolved in a monomer solution that includes one or more aryl polymerizable monomers, in an aqueous phase which can be stationary or flowing, and
B) polymerizing the monomers in the dispersed organic droplets in a low shear flow pattern to form unexpanded polymer beads.

In one embodiment of the current invention a dispersion of organic droplets is formed by pressure atomizing an organic phase below the free surface of an aqueous phase, which can be stationary or flowing.

In another embodiment of the current invention a dispersion of organic droplets of an organic liquid phase in an aqueous phase, which can be stationary or flowing, is formed by applying mechanical agitation.

As used herein the term "aqueous phase" is not meant to be limiting or to require that the continuous phase in the dispersion contain water. "Aqueous phase" as used herein refers to the non-organic phase in the dispersion, which can include water and/or other polar and/or protic solvents, non-limiting examples being alcohols, glycols, and glycerine.

The organic phase (i.e. organic droplets) can have a density of ±20% of the density of the aqueous phase.

Further, the organic phase (i.e. organic droplets) can contain an organic solution that includes one or more of the above-described elastomeric polymers dissolved in a monomer solution containing one or more aryl polymerizable monomers as described above.

The dispersed droplets of the organic phase can make up at least 0.01, in some cases 0.1, in other cases at least 1, and in some instances at least 5 volume percent of the total volume of the organic and aqueous liquids. Additionally, the dispersed organic phase droplets can be present at a level of up to 60, in some cases 55, in other cases 50, in some situations at least 45, and in other situations at least 40 volume percent of the total volume of the organic and aqueous liquids. The dispersed organic phase droplets can be present in the dispersion at any level or can range between any of the values recited above.

The aqueous liquid or aqueous phase can make up at least 40, in some cases 45, in other cases at least 50, in some instances at least 55 and in other situations at least 60 volume percent of the total volume of the organic and aqueous liquids. Additionally, the aqueous liquid or aqueous phase can be present at a level of up to 99.99, in some cases 99.9, in other cases 99, and in some situations at least 95 volume percent of the total volume of the organic and aqueous liquids. The aqueous liquid or aqueous phase can be present in the dispersion at any level or can range between any of the values recited above.

The organic phase can be contained in a holding tank, or a pipe or a loop reactor from which it is fed into a dispersion tank or reactor.

The dispersed organic droplets in the present dispersion can have an average diameter of at least 0.001, in some cases at least 0.01, in other cases at least 0.1, and in some instances at least 1 mm. Also, the dispersed organic droplets in the present dispersion can have an average diameter of up to 10, in some cases up to 7.5, and in other cases up to 5 mm. The size of the dispersed organic droplets will depend on the equipment used, the particular formulation used to make the dispersion, and the type of agitation used. The desired final bead size is used to identify the desired size for the dispersed organic droplets. The size distribution of the droplets can be estimated using one of the methods described above to estimate the size distribution of polymerized beads, i.e. taking a sample from a population, photographing the droplets and analyzing the photographic image using software known in the art as capable of sizing the diameter of the droplets in the image. Using the obtained set of diameters, the average diameter for the sample, standard deviation and the sample size distribution can be calculated. In the particular case where the dispersed droplets are obtained by the atomization method described herein, the size distribution of the droplets can also be estimated by recording the dispersion process with a video camera and capturing individual recorded images of the dispersed droplets at different times during the atomization process. The images can then be analyzed for their size using software known in the art that is capable of determining the diameters of the droplets displayed on the images. The set of obtained droplets diameters is used to calculate statistical parameters such as average droplet diameter, standard deviation and droplet size distribution. The size of the dispersed organic droplets in the present dispersion can be any value or can range between any of the values recited above.

In the present invention, the dispersed organic droplets are polymerized in a low shear flow pattern. In other words, only a minimal amount of agitation energy is applied to the dispersion so as to minimize the shear stress that the droplets are subjected to during their movement. In this way, mixing inside the droplets and any deformation or change in the shape of the droplets is minimized. This process feature in the present method allows for the dispersed droplets of organic phase to act as mini bulk reactors resulting in resin beads having the desired morphology where the continuous phase contains the elastomeric polymers and the dispersed phase contains the homopolymers and/or copolymers of one or more aryl polymerizable monomers.

Conversely, it is known in the art (see for example Freeguard G. F., *J. of Applied Polymer Science*, vol 15, No 7, 1971, pg. 1657-1663, Production of rubber modified polystyrene. II Significance of shear in phase inversion.; Keskkula H., *Plastics and Rubber. Materials and Applications*. Vol. 4, 1979, pg. 66-71 Factors influencing rubber phase morphology in polystyrene; Keskkula H. *Plastics and Rubber. Materials and Applications*. May, 1979, pg. 71-76, Phase separation in polybutadiene-polystyrene systems; Wagner E. R., Robeson L. M., *Rubber Chemistry and Technology*, vol. 43, 1970, pg. 1129-1137, Impact polystyrene: factors controlling the rubber efficiency; Soto G. et al. *J. of Applied Polymer Science*, vol. 92, No. 3, May 5, 2004, pg. 1397-1412, Bulk Polymerization of Styrene in the Presence of Polybutadiene: Effect of Initiator Type and Prepolymerization Conditions on Particle Morphology; Molau G. E., Keskkula H., *J. Polymer Science*, vol. 4, 1966, pg. 1595-1607, Heterogeneous polymer systems. IV. Mechanism of rubber particle formation in rubber modified vinyl polymers; Riess G., Gaillard P., *Preparation of rubber-modified polystyrene: influence of the reaction conditions on phase inversion and morphology, Polymer reaction engineering: influence of reaction engineering on polymer properties*, Edited by Reichert and Geisekler, Munich 1983; Eastmond G. C., Phillips D. G., *Colloid and polymer Science*, vol 262, No. 8, 1984, pg. 627-634, On the Form and Formation of Rubber Particles in Impact Polystyrene and Their Relationship to Natural and Synthetic Materials) that use of intensive mixing to produce high shear and turbulence levels during the polymerization of a styrene/elastomeric organic phase promotes phase inversion and provides a resin morphology that is the opposite to the inventive morphology described above. Hence, polymerization under high shear and turbulence levels, can provide a morphology in which the elastomeric polymers form discrete occlusions in a continuous phase comprising homopolymers and/or copolymers of one or more aryl polymerizable monomers. For example, standard high impact polystyrene (HIPS) resin beads contain discrete particles of an elastomeric polymer dispersed throughout a continuous styrene polymer matrix. HIPS preparation involves intensive agitation methods during prepolymerization of styrene containing a dissolved elastomeric component, followed by dispersion and further polymerization of the styrene monomer. The resulting HIPS resin morphology is precisely opposite to what the present invention provides.

In addition, although bulk polymerization methods exist (for example, in situ polymerization methods without mixing or agitation), that can provide bulk materials that contain a continuous phase including elastomeric polymers and a dispersed phase that includes homopolymers and/or copolymers of aryl polymerizable monomers, the prior art methods do not provide for making resin beads with such a morphology.

The present inventors have surprisingly found that when dispersed organic droplets are polymerized in a low shear flow pattern as described above, resin beads having the above-described morphology are formed. That is, the resin beads of the current invention have a morphology in which the continuous phase contains elastomeric polymers and the dispersed phase contains homopolymers and/or copolymers of one or more aryl polymerizable monomers. The exact nature of the morphology can be affected by the type of agitation and energy input provided by the method used to provide the low shear flow pattern.

Generally, under very low shear and/or energy input conditions during polymerization, a crosslinked web morphology is present. Under low shear flow pattern conditions that provide more shear and/or energy input, a morphology comprising threads having a large aspect ratio, which are optionally at least partially crosslinked and/or connected via locally formed branches and/or an interconnected mesh structure is present in the resin beads.

In the present invention, the organic liquid phase can have a shear viscosity measured at ambient temperature and pressure of at least 0.1, in some cases at least 10, in other cases at least 50 and in some situations at least 100 centipoise (cps) and can be as high as 10,000, in some instances up to 8,000, in other instances up to 6,000, in some cases up to 4,500, and in other cases up to 2,500 cps. The viscosity of the organic liquid phase can be any value or range between any of the values recited above.

The organic phase contains an organic solution that includes the elastomeric polymers dissolved in a monomer solution that includes one or more aryl polymerizable monomers. As such, the elastomeric polymers are present in the organic solution at a level of at least 1, in some cases at least 5 and in other cases at least 10 wt. % of the organic solution. Also, the elastomeric polymers can be present at up to 50, in some cases up to 40, and in other cases up to 30 wt. % of the organic solution. The precise amount of elastomeric polymers employed will depend on the properties desired in the resulting resin bead and/or expanded resin bead made there from. The amount of elastomeric polymers in the organic solution can be any amount or can range between any amount recited above.

Additionally, the monomer solution can be present in the organic solution at a level of at least 50, in some cases at least 60 and in other cases at least 70 wt. % of the organic solution. Also, the elastomeric polymers can be present at up to 99, in some cases up to 95, and in other cases up to 90 wt. % of the organic solution. The precise amount and composition of the monomer solution employed will depend on the properties desired in the resulting resin bead and/or expanded resin bead made therefrom. The amount of monomer solution in the organic solution can be any amount or can range between any amount recited above.

When homopolymers are desired in the dispersed phase of the present resin bead, the monomer solution will contain only one type of aryl monomer. When copolymers are desired in the dispersed phase of the resin bead, the aryl monomers can be included in the monomer solution at a level of at least 25, in some cases at least 35, and in other cases at least 40 wt. % of the monomer solution. Also, the aryl monomers can be included at up to 99, in some cases up to 95, in other cases up to 90, in some instances up to 80 and in other instances up to 75 wt. % of the monomer solution. The precise amount and type of aryl monomer used in the monomer solution will depend on the properties desired in the resulting resin bead and/or expanded resin bead made there from. The amount of aryl monomer in the monomer solution can be any amount or can range between any amount recited above.

Also, when copolymers are desired in the dispersed phase of the resin bead, the non-aryl monomers can be included in the monomer solution at a level of at least 1, in some cases at least 5, in other cases at least 10, in some instances at least 20 and in other instances at least 25 wt. % of the monomer solution. Also, the non-aryl monomers can be included at up to 75, in some cases up to 65, in other cases up to 55 wt. % of the monomer solution. The precise amount and type of non-aryl monomer used in the monomer solution will depend on the properties desired in the resulting resin bead and/or expanded resin bead made there from. The amount of non-aryl monomer in the monomer solution can be any amount or can range between any amount recited above.

The aqueous phase (suspension medium) can be selected to enhance the production of the uniform droplets of the organic liquid phase. The viscosity of the aqueous phase can be at least 1, in some cases at least 2, and in other cases at least 5 cps and can be as high as 400, in some cases up to 250, and in other cases up to 100 cps. The viscosity of the aqueous phase can be any value or range between any of the values recited above.

In addition, the aqueous phase can have a sufficiently different density from that of the organic liquid phase. In an embodiment of the invention, the density of the aqueous phase is greater than or equal to the density of the droplets of the dispersed organic liquid, with the density of the aqueous phase being from about 1.02 to about 1.2 times the density of the droplets of dispersed organic liquid. If the dispersed organic liquid is further polymerized the density of the dispersed droplets or particles can change and typically increase. Alternatively, if the droplets of the dispersed organic liquid were to descend through the suspension medium, the density of the aqueous phase can be from about 0.98 to about 0.80 times the density of the droplets of dispersed organic liquid.

The aqueous phase is suitably inert and is immiscible with the organic liquid phase. As used herein, the term "immiscible" means that less than about 1 weight percent of the organic liquid phase is miscible (or soluble) in the suspending liquid (i.e. the aqueous phase does not solvate more than about 1 weight percent of the organic liquid phase). In an embodiment of the invention, less than about 0.1 weight percent of the organic liquid phase is miscible in the aqueous phase.

The aqueous phase contains water and can be a mixture of water with one or more water-miscible organic liquids such as the lower alkyl alcohols such as methanol or butanol. The addition of organic liquids which are immiscible with the organic liquid phase and may or may not be immiscible with the aqueous phase, and salts may be used to vary (increase) the density of the aqueous phase.

In an embodiment of the invention, the aqueous phase will contain one or more surfactants or suspending aids. However it is also possible to add the suspending aid to the organic liquid phase. Suitable suspending aids are those materials which enable the formation of the monomer phase into spheroidal droplets of a desired size and which hinder the coalescence or secondary dispersion (breakage) of the thus-formed droplets.

Suspension stabilizers are well known in the art and include organic stabilizers, such as poly (vinyl alcohol), typically hydrolyzed at least 70%, in many cases up to 95%, and in some cases at no more than 98% and having a weight average molecular weight from about 30,000 to 300,000, typically from 75,000 to 300,000; carboxymethy cellulose typically having a weight average molecular weight up to 500,000; gelatine; agar; polyvinyl pyrrolidine; polyacrylamide; cationic polymers, non-limiting examples including homopolymers and copolymers of dimethyl diallyl ammonium chloride, (meth)acrylamidopropyltrimethyl ammonium chloride, (meth)acryloyloxyethyltrimethyl ammonium chloride, poly(meth)acryloyloxyethyltrimethyl ammonium methyl sulfate, and combinations thereof; inorganic stabilizers, such as alumina, bentonite, magnesium silicate; surfactants, such as sodium dodecyl benzene sulfonate; or phosphates, like tricalciumphosphate, disodium-hydrogen phosphate, optionally in combination with any of the stabilizing compounds mentioned earlier. In some cases the stabilizer effectiveness may be enhanced by using an extender. One skilled in the art may readily determine the usefulness of any particular stabilizer or combination of stabilizers and/or extenders. The amount of stabilizer may suitably vary from 0 up to 10 weight %, in some cases 0.01 to 10, in other cases 0.1 to 8, and in particular cases 0.1 to 5% by weight, based on the weight of the aqueous phase and depending on the viscosity of the organic liquid phase (e.g. higher viscosity liquids require more stabilizer). If the suspending aid or stabilizer is added to the organic liquid phase it can be added in an amount sufficient to provide the same amount of stabilizer.

The suspension stabilizer can be capable of forming a surface between the aqueous phase and the droplets of organic liquid phase having an interfacial tension of not less than 3, in some cases not less than 8, and in other cases greater than or equal to 12 dynes/cm when measured according to ASTM D-971 at ambient pressure and temperature.

In accordance with this embodiment of the invention, one or more members selected from initiators, anti-static agents or additives, flame retardants, pigments (colorants) or dyes, fillers, stabilizers (UV and /or heat and light), coating agents, plasticizers, chain transfer agents, crosslinking agents, nucleating agents, and insecticides and or rodenticides can be added to either the organic liquid phase, the aqueous phase, or both, in an amount from 0 up to 10 weight %, in some cases from 0.1 to 10, in other cases from 0.05 to 8, and in particular cases from 0.1 to 5 weight % of the organic liquid phase.

Suitable initiators include, but are not limited to organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl perbenzoate, t-butyl peracetate, t-butyl perisobutyrate, t-butylperoxy 2-ethylhexyl carbonate, carbonoperoxoic acid, (1,1-dimethylpropyl) (2-ethylhexyl) ester, hydroperoxides and dihydrocarbyl peroxides, such as those containing $C_{3-10}$ hydrocarbyl moieties, including di-isopropyl benzene hydroperoxide, di-t-butyl peroxide, dicumyl peroxide and combinations thereof.

Other initiators, different from peroxy compounds, are also possible, as for example azides such as 2,2'-azobisisobutyronitrile. The amount of initiator is suitably from 0.01 to 1 weight %, based on the amount of organic liquid phase.

The aqueous phase or organic liquid phase can also contain an anti-static additive or agent; a flame retardant; a pigment (colorant) or dye; a filler material, plasticizers, such as white oil. The aqueous phase or the organic liquid phase can also contain coating compounds typically including silicones; metal or glycerol carboxylates, suitable carboxylates include glycerol mono-, di- and tri-stearate, zinc stearate, calcium stearate, and magnesium stearate; and mixtures thereof. Examples of such compositions are disclosed in GB 1,409, 285 and U.S. Pat. No. 4,781,983. The coating composition can be applied to the particles via dry coating or via a slurry or solution in a readily vaporizing liquid in various types of batch and continuous mixing devices. This coating aids in preventing the resulting foamed cellular particles from forming agglomerates during the pre-expansion stage, and therefore, aids in improving the quality of any resulting molded foamed article.

The aqueous phase or the organic liquid phase, or both can contain various additives such as chain transfer agents, suitable examples including $C_{2-15}$ alkyl mercaptans, such as n-dodecyl mercaptan, t-dodecyl mercaptan, t-butyl mercaptan and n-butyl mercaptan, and other agents such as pentaphenyl ethane and the dimer of α-methyl styrene. The organic liquid phase or the aqueous phase can contain cross-linking agents, such as butadiene and divinylbenzene, and nucleating agents, such as polyolefin waxes. The polyolefin waxes, non-limiting examples being polyethylene waxes, have a weight average molecular weight of 500 to 5,000. The waxes can be used in a quantity of 0.05 to 1.0% by weight, based on the amount (weight) of the organic liquid phase. The aqueous phase or the organic liquid phase can also contain from 0.1 to 0.5% by weight, of talc, organic bromide-containing compounds, and polar agents as described for example in WO 98/01489 which may include alkylsulphosuccinates, sorbital-$C_8$-$C_{20}$ carboxylates, and $C_8$-$C_{20}$ alkylxylene sulphonates. Nucleating agents can be incorporated in the aqueous phase or the organic liquid phase, or both and they are particularly useful because they tend to improve the formation of cells if the invention is used to form foamable polymers.

Suitable insecticides are disclosed in U.S. Pat. Nos. 6,153,307 and 6,080,796. These include boron compounds (borates and boric acid). Some useful insecticides may be selected from the group consisting of 1-[(6-chloro-3-pyridinyl)methyl]-4,5-dihydro-N-nirto-1H-imidazol-2-amine and 3-(2,2-dichloroethenyl)-2,2-di-methylcyclopropanecarboxylic acid cyano (3-phenoxyphenyl)-methyl ester (cypermethrin), the active ingredient in, for example, Demon TC sold by Zeneca; 3-(2,2-dichloroethenyl)-2,2-dimethylcyclopropanecarboxylic acid (3-phenoxyphenyl) methyl ester (permethrin), the active ingredient in, for example, Dragnet FT and Torpedo sold by Zeneca; and 1-[(6-chloro-3-pyridinyl)methyl]-4,5-dihydro-N-nirto-1H-imidazol-2-amine (imidacloprid), the active ingredient in, for example, PREMISE® sold by Bayer.

In one embodiment the organic liquid phase contains from 0 to about 40, in some cases from 3 to 20, and in other cases from 8 to 15 weight % of water to produce polymer particles having from 4 to 16% of water as taught in U.S. Pat. No. 6,176,439. In another embodiment, the organic liquid phase can contain from 1 to 20, and in some cases from 3 to 15 weight % of water as taught in column 3, lines 19-26 of U.S. Pat. No. 6,160,027 discussed above. The text of these patents is herein incorporated by reference.

One of the methods used to disperse the organic phase in accordance with the present invention is to use pressure atomizers, particularly when mono-sized droplets are desired. Pressure atomizers, typically, are circular orifices and have diameters from 0.01 to 2, in some cases from 0.1 to 1, in other cases from 0.1 to 0.8 mm, in some instances from 0.1 to 0.5, and in other instances from 0.1 to 0.4 mm and a length less than about 5 mm. Generally, the atomizer will have a length to diameter (L/D) ratio ranging from about 0.2 to about 10, in some cases from 0.2 to 5.

In an embodiment of the invention, the organic liquid phase can be injected into the aqueous phase and dispersed into droplets using an atomizer or a header plate that includes atomizers (e.g., a plate having a number of holes of the above dimensions therein). The number of atomizers which can be accommodated in a header plate will depend on the size of the plate and the size and spacing of the atomizers. A header plate can contain multiple atomizers provided their operations do not interfere with each other. Care should be taken to minimize the interaction between atomized streams, particularly in the vicinity of the atomizer exits. There is a need to space the individual atomizers sufficiently far apart to minimize the interaction between adjacent streams from adjacent atomizers. Excessive interactions between adjacent streams can cause deformation of the atomized droplets due to their direct collisions or may lead to premature dispersion of the streams resulting in a broad size distribution of the atomized droplets. The interactions between adjacent streams of organic liquid phase do not appear to be significant when adjacent streams are separated by a distance of at least 5, in some cases 10 times the average diameter of the atomized droplets.

The atomizers can be equally spaced in a square or other pattern over the entire surface of the header plate.

In order to reduce viscosity of the organic liquid phase to improve the quality of atomization, in one embodiment of the invention, the organic liquid phase to be atomized is heated at one or more locations selected from the storage tank for the organic liquid phase, the transfer line from the storage tank to the atomizer inlet, and the atomizer.

The organic liquid phase contained in the storage tank and/or in the transfer line can be heated to a temperature from ambient (20° C.) up to below the decomposition point of the components of the liquid (e.g. decomposition point of polymer in the liquid to be atomized). In one embodiment of the invention the temperature can be the set temperature of the process if, for example, the atomized liquid is to be polymerized up to about 135° C. The temperature can range from at least about 30° C., in some cases not less than 45° C., and in other cases not less than 50° C. Generally temperatures of the organic liquid at the atomizer inlet from about 50° C. to 95° C. are useful and sufficient for the required dispersion.

The atomizers can also be heated to similar temperatures. For example, the exit part of the atomizer comprising the orifice plate could be heated with a circulating liquid such as water or another heat transferring liquid or, preferably could be heated by other means such as electrical heaters.

The organic liquid phase can be added to the aqueous phase at a rate from 0.05 to 15, in some cases 0.1 to 12, and in other cases 0.5 to 10 ml/sec/per atomizer. The liquid is passed through the atomizer located below the free surface of the aqueous phase and forms a liquid stream within the aqueous phase and this stream disperses downstream from the atomizer exit as the liquid droplets in the aqueous phase. The average size of the atomized droplets is determined by the atomizer geometry, organic liquid exit velocity from the atomizer and properties of both the aqueous phase and the organic liquid phase. A higher viscosity of the suspending medium and/or the atomized organic phase can be employed in the preparation of larger droplets of atomized organic liquid phase.

In an embodiment of the invention, the droplets can have an average size from about 0.1 to 10 mm, in some cases from 0.1 to 5 mm, and in other cases from 0.3 to 3 mm. For relatively uniform atomized droplets the standard deviation for size distribution is typically less than about 10%, and in many cases less than 8% of the average droplet diameter of atomized liquid. As a non-limiting example, for a droplet size from about 0.3 to 5 mm the standard deviation from the mean droplet size can be from about 0.03 to 0.35 mm (e.g. not more than 8% of the average droplet diameter). Typically, the average droplet diameter is substantially larger than the diameter of the atomizer.

The organic liquid phase is forced through the atomizer(s) under pressure. Typically the pressure is not greater than 100 bars, and can be from 3 to 100 bars, in some cases from 3 to 80, and in other cases from 5 to 60 bars. The pressure energy of the atomized liquid is converted in an atomizer to a stream kinetic energy. This kinetic energy further leads to stream disintegration when a stream interacts with the atomizer orifice exit and with the surrounding aqueous phase. This interaction generates a disturbance which breaks the stream into droplets either at the atomizer exit or the disturbance propagates downstream within the stream and breaks the stream into droplets at some distance further from the atomizer exit. In one embodiment of the invention the pressure of the flowing organic liquid phase to be atomized is subjected to continuous or intermittent pulsation upstream of the atomizer inlet of less than 20%, in some cases from 1 to 10, and in other cases from 3 to 10%, of the static pressure of the atomized liquid. The frequency of the pulsation depends, among other parameters, on the viscosity of the organic liquid phase and can range from 1 to 500, in some cases less than 200 Hz, and in other cases less than 150 Hz. The imposed pressure pulsation strengthens and amplifies the original disturbance generated by the stream-atomizer interaction in a way that affects droplet size distribution and, usually, makes it more uniform. By adjusting frequency and amplitude of the imposed pressure pulsation, a dual size or customized distributions of atomized droplets can be generated. In the case of atomization of more viscous Non-Newtonian liquids, pressure pulsation can be imposed as a primary mechanism/source of stream breakup (droplet formation). See, as a non-limiting example U.S. Pat. No. 6,747,107, the relevant portions of which are incorporated herein by reference.

In an embodiment of the invention, the atomization can take place directly into a reactor under the free surface of the aqueous phase or it can take place into a holding tank for subsequent transfer to a reactor. The atomized droplets should be maintained under shear and turbulence conditions, which minimize droplet interaction and provide a low momentum movement of the droplets in order to decrease the probability of droplet agglomeration or secondary breakup. Generally, the conditions should require a flow pattern within the aqueous phase with low, preferably relatively uniform, shear and low, controlled turbulence levels. Advantageously, the aqueous phase can be subjected to laminar motion, which can be substantially uniform through the aqueous phase volume, as opposed to a local laminar motion zone which a low speed impeller may generate.

Such conditions are particularly important when the atomized droplets are subsequently polymerized and the initial size distribution should be either maintained during the process, or improved, or modified (reduced) in a controlled manner, resulting in the required final size distribution of the bead product.

During the polymerization, the dispersed liquid droplets or solid particles desirably remain submerged below the free surface of the aqueous phase and be substantially uniformly distributed in the aqueous phase in a way that minimize droplet-droplet interaction, (e.g. particle or droplet collision) but also provides other requirements, for example adequate heat transfer.

As a non-limiting example, the very low shear conditions described above are provided using the polymerization method disclosed in U.S. Pat. No. 6,610,798, the relevant portions of which are herein incorporated by reference. As such, the low shear flow pattern is a controlled low turbulence flow pattern created, without mechanical agitation, by continuously or periodically injecting at gauge pressure up to 15 bar into selected parts of the reactor one or more streams of a gas inert to the reactor contents and immiscible with the reactor contents.

One method for maintaining such conditions is a process for creating a low shear flow pattern with a controlled low turbulence level, without mechanical agitation, in a aqueous phase contained in a vessel, including continuously or periodically injecting into selected part(s) of the vessel a stream of fluid immiscible and inert to the vessel contents and having a density lower than the reactor contents, and retrieving this fluid above free surface of aqueous phase and, in many cases reinjecting it back to the vessel. In an embodiment of the invention, the injected fluid is an inert gas not soluble in the aqueous phase or organic liquid phase.

If the initial droplet size distribution needs to be preserved to the largest extent during processing, the dispersed droplets, can be distributed uniformly within a volume of the aqueous phase, exposed to a low shear and remain in a laminar motion within the aqueous phase.

Optionally, the initial droplet size distribution may be improved to become more uniform and/or the average diameter slightly reduced. In this embodiment, a certain percentage of the largest droplets (e.g. up to 15% of the largest droplets) in the population can be broken in a controlled manner, by being exposed to low turbulence low shear flow pattern in the aqueous phase.

In a further embodiment the entire droplet size distribution can be reduced by causing a secondary break up of a majority (e.g. at least 85%) of the droplets in the aqueous phase.

In an embodiment of the invention, the required flow pattern can be created in the vessel by injecting one or more streams of a fluid having a density substantially lower than the aqueous phase and the dispersed droplets of the organic liquid phase and inert and immiscible with the reactor contents, into selected locations, in many cases including the bottom parts of the reactor or vessel volume. The fluid may be continuously or periodically injected, (to keep the dispersed droplets of organic liquid phase from sinking to the bottom of the reactor or rising to the free surface of the aqueous phase), with a controlled frequency of injection depending on the ratios of densities and volumes of the aqueous phase and dispersed liquid droplets of organic liquid phase.

In an embodiment of the invention, such a fluid with a sufficiently low density suitable for injection is a gas. The gas can be selected from inert gases, not soluble in the aqueous phase, air and nitrogen, in many cases nitrogen. The gas can be injected into the aqueous phase at a gauge pressure of up to 15 bar (a non-limiting example being from 0.001 to 15 bar gauge). The gauge pressure referred to herein refers to the difference between the absolute static gas pressure upstream from the gas injection port, and the combined (sum of) the hydrostatic pressure of the aqueous phase in a vessel and an absolute ambient static pressure above the free surface of the aqueous phase.

If gas is selected as the fluid injected to the reactor, two modes of injection are possible, see for example, U.S. Pat. No. 6,727,328, the relevant portions of which are incorporated herein by reference.

The first mode of injection is to inject gas at low pressure (in many cases less than 3 bar gauge) through the injection ports, so the injected gas forms streams of bubbles in the aqueous phase downstream from the injection ports, with an average bubble size substantially larger (in many cases at least two times, in other cases at least five times) than the average diameter of the dispersed droplets of organic liquid phase. Due to the balance of buoyancy, gravity and drag forces, the bubble stream rises towards the free surface of the aqueous phase where the gas can be recovered and, in many cases, recycled back to the vessel. As the gas bubble stream flows towards the free surface, it interacts with the aqueous phase and its momentum creates a flow pattern in the reactor, forcing the aqueous phase into a circular low shear, low turbulence motion creating a recirculation zone in the reactor. The velocity gradients and geometry of the generated zone can be controlled by the geometry (number, diameters and locations) of the gas injection ports and by gas flow rate. The dispersed particles or droplets of organic liquid phase flow within the recirculation zone and are subjected to a sufficiently low shear rate and turbulence so that they remain submerged without excessive mutual interaction, their momentum sufficiently low, so even when they collide—the probability of agglomeration or breakup resulting from such a low impact collision remains very low. This motion of particles can be maintained for particles which are lighter than the aqueous phase and for the particles which are heavier than the aqueous phase, providing that the density difference between dispersed droplets of organic liquid phase and aqueous phase is typically within the range of ±20% (i.e. the ratio of the density of the dispersed droplets of organic liquid phase to the density of the aqueous phase can range from 0.8:1 to 1.2:1).

In an embodiment of the invention, the injection ports have diameters substantially (e.g. at least two times) larger than the average diameter of the dispersed droplets of organic liquid phase. The locations of the gas injection ports are selected based on the concentration of the dispersed droplets of organic liquid phase and the dispersed droplet/particle density. Generally, the injection ports are located in the reactor below the layer of the dispersed droplets of organic liquid phase contained in the aqueous phase. Accordingly, to submerge dispersed droplets/particles of organic liquid phase having a density lower than the density of the aqueous phase and to prevent their floating motion, the injection ports can be beneath the floating particle/droplet layer and can be located in the reactor walls or in the bottom.

To elevate particles/droplets heavier than aqueous phase and to prevent their sedimentation on the vessel bottom, some of the injection ports can be located in the bottom of the reactor. In this case, a modification of the geometry of the reactor bottom, e.g. into an inverted conical or frustroconical type of a shape, can be desirable. In one embodiment of the present invention the reactor bottom is an inverted conical shape, with one injection port situated in the tip of the cone and a plurality of other ports located tangentially to the cone cross section, at a level corresponding to the height of the cone.

If the density of the dispersed droplets/particles of organic liquid phase changes during the process, as for example during polymerization of the monomers in the dispersed droplets of organic liquid phase, a combination of both types of port arrangements (i.e. in the reactor walls and bottom) can be used. A useful general arrangement of the port locations is where the main ports located in the reactor bottom and, optionally, some supporting ports in the lower parts (e.g. bottom half, preferably bottom quarter) of the reactor walls are included.

The gas injection rate determines the level of turbulence in the created flow pattern in the reactor. The gas injection rate will depend on a number of factors including the volume and density ratios of the dispersed droplets of organic liquid phase and the aqueous phase; the viscosity of the aqueous phase; the geometry of the vessel; and the size of the droplets/particles of the dispersed organic liquid phase. Suitable gas injection rates can be determined by one skilled in the art by repeating experimentation.

Generally, to preserve the initial size distribution of the dispersed droplets/particles of organic liquid phase to the largest extent, the level of turbulence of the aqueous flow phase in the reactor is sufficiently low so the motion of the reactor contents is laminar.

If required, the initial particle or droplet size distribution of the organic liquid phase can be also modified to a certain extent during processing by properly adjusting, the gas flow rate. Although the average droplet/particle size cannot be increased by controlled agglomeration of droplets/particles, it can be reduced in some cases or improved towards more uniform distribution by increasing the gas injection rate to cause the breakup of only the largest droplets/particles (e.g. the 15% of the largest particles) in the population. The breakup is caused by the controlled increase of the turbulence level within the flow pattern created by the gas bubbles, and not by particle or droplet interaction (e.g. collision).

In a further embodiment of the present invention, the average droplet/particle size of the dispersed organic liquid phase can be substantially reduced by causing a break up of a majority (e.g. at least 85%) of the droplets of the dispersed organic liquid phase. In this embodiment a flow pattern with higher shear and turbulence level is generated in the aqueous phase by applying higher gas injection rates, to break up the droplets.

The second mode of gas injection can be applied in processes where the dispersed droplets/particles of organic liquid phase, which are to be distributed and suspended have a density lower than the aqueous phase and would flow towards the free surface and agglomerate there in a layer, if left without applying the inventive processing described herein. In this mode, gas is injected at high pressure, typically 5 bar (gauge) and above, to generate a large number of very small gas bubbles, distributed within the volume of the aqueous phase. The injection ports have diameters at least an order of magnitude, in many cases several orders of magnitudes smaller than the average diameter of the dispersed droplets/particles of organic liquid phase The concentration of gas bubbles should be sufficiently high so the effective density of the aqueous phase becomes reduced to a value lower than the density of the dispersed organic liquid phase and, as a result, the dispersed droplets/particles of organic liquid phase begin to sink. In this mode the periodic gas injection can be particularly useful in creating an "oscillatory" movement of the particles or droplets, as during the injection period the particles or droplets sink and next when gas supply is shut off and gas bubbles leave the aqueous phase exiting through the free surface of the aqueous phase, the particles rise from the bottom part of the vessel or reactor and float again towards the free surface. The next gas injection should take place before the droplets/particles of the dispersed organic liquid phase reach the free surface of the aqueous phase. The mechanism responsible for the small bubble size is mainly the turbulence of the gas stream. Bubbles rise towards the free surface, usually with high velocity, their residence time in the aqueous phase is brief but the flow pattern generated in the aqueous phase can be at a much higher turbulence level than in the first mode of injection. Therefore where necessary, care should be taken not to break floating particles or droplets. In this mode of injection, a higher viscosity (typically 10 cps or higher) of the aqueous phase is advantageous, as it slows down the gas bubbles increasing their residence time in the aqueous phase and reduces the overall level of turbulence in the vessel.

In another embodiment of the invention, the monomers in the dispersed droplets described above can be polymerized while being subjected to low shear conditions applied by or created with the use of mechanical agitation. Any suitable mechanical agitator can be used in the invention so long as its energy input is low enough to minimize any droplet-droplet interaction and providing sufficiently low momentum that even when the droplets do collide, the probability of agglomeration or breakup resulting from such a low impact collision remains very low.

In a particular embodiment of the invention, the mechanical agitation can be provided by one impeller or in some cases by more than one impeller, one or more magnetically driven stirrers and/or other mechanically driven stirrers. Further to this embodiment and not meant as a limitation, two specific low shear scenarios can be encountered.

In the first scenario, the impeller(s) or mechanically driven stirrer(s) interact with the aqueous phase in a continuous manner. The impeller(s) or stirrer(s) provide momentum that creates a flow pattern in the reactor that forces the aqueous phase into a circular low shear, low turbulence motion creating a recirculation zone in the reactor. The velocity gradients and geometry of the generated zone can be controlled by the location, rotational direction, and/or geometry of the impeller (s) or stirrer(s). The specific locations and geometries of the impeller(s) and/or stirrer(s) are selected based on the concentration of the dispersed droplets of organic liquid phase and the dispersed droplet/particle density. The created flow pattern can be radial or axial and can comprise single or multiple circulating loops within the reactor volume. The recirculation flow pattern keeps the dispersed droplets in continuous motion. The flow pattern also prevents droplet agglomeration on the free surface of the reactor when the droplet density is lower than the density of the aqueous phase and/or prevents droplet/particle sedimentation on the reactor bottom when the droplet/particle density is higher than the density of the continuous aqueous phase. The dispersed particles or droplets of organic liquid phase flow within the recirculation zone(s) and are subjected to a sufficiently low shear rate and turbulence so that they remain submerged without excessive mutual interaction, their momentum sufficiently low, so even when they collide, the probability of agglomeration or breakup resulting from such a low impact collision remains very low. This motion of particles can be maintained for particles which are lighter than the aqueous phase and for the particles which are heavier than the aqueous phase, providing that the density difference between dispersed droplets of organic liquid phase and aqueous phase is typically within the range of ±20% (i.e. the ratio of the density of the dispersed organic liquid phase to the density of the aqueous phase can range from 0.8:1 to 1.2:1).

In most instances, the rotational speed and geometry of the impeller(s) and/or stirrer(s) determines the level of turbulence in the created flow pattern in the reactor. The rotational speed will depend on a number of factors including the volume and density ratios of the dispersed droplets of organic liquid phase and the aqueous phase; the viscosity of the aqueous phase; the geometry of the vessel; and the size of the droplets/particles of the dispersed organic liquid phase. Suitable rotational speeds can be determined by repeated experimentation and suitable types of impeller(s) and/or stirrer(s) can be selected for application by those skilled in the art.

Generally, to provide a good size distribution of the dispersed droplets/particles of organic liquid phase and to ensure formation of resin beads having a continuous phase comprising elastomeric polymers (i.e. phase inversion in the polymerizing organic droplets does not occur), the level of turbulence of the flow pattern in the reactor is uniform and sufficiently low so the motion of the reactor contents is laminar or transient (between laminar and turbulent). In order to maintain adequate mixing in the reactor, and to keep organic droplets submerged and not agglomerating in the low shear and low turbulence flow pattern, the agitation should be created by one or, in some cases, multiple impellers rotating at low speed.

The ratio of impeller diameter to tank diameter, or the ratio of the impeller diameter to the sum of tank diameter and baffle width, is between 0.6 and 0.95. In some cases, the ratio of impeller diameter to tank diameter, or the ratio of the impeller diameter to the sum of tank diameter and baffle width is between 0.75 and 0.95. The impeller should rotate at relatively low speed, so that the linear speed of the impeller tip, v ($v=\pi DN$, where D is impeller diameter and N is number of impeller revolutions per second), should not exceed the impeller tip speed which is typical for a traditional styrene monomer polymerization process, as carried out in a geometrically similar reactor, with the same capacity and with the same loading of an organic phase. In many cases, the impeller tip speed of the current invention is 20-60% lower than the impeller tip speed used during traditional styrene polymerization, so that agitation occurs in transitional flow conditions (where Re<5000) or in laminar flow conditions (where Re<50). The impeller Reynolds number, Re is defined by, $Re=ND^2/v$, where N is the number of impeller revolutions per second, D is an impeller diameter and v is kinematic viscosity of a liquid processed in a tank. This configuration within a reactor creates low and uniform shear flow conditions. Without wishing to be bound by theory, these conditions result in improved droplet size distribution and a more stable suspension process, with reduced probability of organic droplet agglomeration.

If required, the initial particle or droplet size distribution of the organic liquid phase can be also modified to a certain extent during processing by properly adjusting, the rotational speed. Although the average droplet/particle size cannot be increased by controlled agglomeration of droplets/particles, it can be reduced in some cases or improved towards more uniform distribution by increasing the rotational speed of the impeller(s) and/or stirrer(s) to cause the breakup of only the largest droplets/particles (e.g. the 15% of the largest particles) in the population. The breakup is caused by the controlled increase of the turbulence level within the flow pattern created by the impeller(s) and/or stirrer(s), and not by particle or droplet interaction (e.g. collision).

In a further embodiment of the present invention, the average droplet/particle size of the dispersed organic liquid phase can be substantially reduced by causing a break up of a majority (e.g. at least 85%) of the droplets in the dispersed organic liquid phase. In this embodiment a flow pattern with higher shear and turbulence level is generated in the aqueous phase by applying higher impeller(s) and/or stirrer(s) rotational speeds, to break up the droplets.

In another possible mechanical agitation scenario of the current invention, mechanical agitation is applied in a non-continuous, periodic manner during the polymerization process. In this mode, periodic revolutions of the impeller(s) and/or stirrer(s) can be particularly useful in creating an "oscillatory" movement of the particles or droplets and can be applied for particles that have densities lighter or heavier than the density of the continuous aqueous phase. The motion of the impeller(s) or stirrer(s) forces the droplets and/or particles to move within the volume of the aqueous phase, drawing lighter particles down from the free surface or lifting the heavier particles from the bottom part of the vessel or reactor respectively. The next revolution of the impeller(s) and/or stirrer(s) takes place before the droplets/particles of the dispersed organic liquid phase start loosing their momentum and are driven, based on density differences to either float toward the free surface or to descend toward the vessel or reactor bottom respectively. The flow pattern generated in the aqueous phase can be at a higher turbulence level than in the first continuous (non-periodic) mode of mixing. Therefore where necessary, care should be taken not to break the flowing particles or droplets.

In another embodiment of the invention, the organic liquid phase is added to the aqueous phase and dispersed into droplets through the application of mechanical agitation, which is continuously applied during polymerization of the monomers in the dispersed droplets. The principles surrounding this embodiment of the invention are well known to those skilled in suspension polymerization processes using a stirred tank reactor. However, a key difference from traditional processes is that the process described in the present invention is carried out at relatively low rotational speeds of the impeller(s) and/or stirrer(s) such that the organic liquid phase is dispersed by shear forces during the early stages of the process. The low rotational speeds of the impeller(s) and/or stirrer(s) and the resulting low shear applied to the dispersion do not promote phase inversion taking place in the droplets (as opposed to known HIPS suspension polymerization methods).

To create such an agitation pattern, a configuration comprising one, in some cases, multiple impellers rotating at low speed is used. Often, the ratio of impeller diameter to tank diameter, or the ratio of the impeller diameter to the sum of tank diameter and baffle width, is between 0.6 and 0.95, or in some cases between 0.75 and 0.95. The impeller should rotate at relatively low speed, so that the linear speed, v of the impeller tip (v=πDN, where D is the impeller diameter and N is number of impeller revolutions per second), should not exceed the impeller tip speed which is typical for traditional styrene monomer polymerization, as carried out in a geometrically similar reactor, with the same capacity and the same loading of an organic phase. In some embodiments of the invention, the impeller tip speed of the current invention is 20-60% lower than the impeller tip speed used during a traditional styrene polymerization process, so that agitation occurs in transitional flow conditions (where Re<5000) or in laminar flow conditions (where Re<50). The impeller Reynolds numbers, Re is defined by Re=ND$^2$/v, where N is the number of impeller revolutions per second, D is the impeller diameter and v is kinematic viscosity of a liquid processed in a tank. This configuration within a reactor creates low and uniform shear flow conditions which result in improved droplet size distribution and a more stable suspension in which there is a reduced probability of organic droplet agglomeration.

As a result, the morphology of the polymerized droplets retains rubber in a form where it is maintained in a continuous phase and the polymerizing monomers form small occlusions distributed in a network created in the continuous phase. This morphology is maintained throughout the polymerization of the monomers and in the resulting resin bead.

In a further embodiment of the invention, the atomization process as described above can be used in combination with the mechanical agitation scenario described above to provide the instant resin beads.

Typically, the polymerization of the monomers in the dispersed droplets of organic liquid phase will be to not less than 90%, in many cases not less than 95%, and in other cases not less than 99.5% or to a greater conversion. The aqueous phase can be heated during the process, as discussed above, to temperatures up to 135° C., in many cases not more than 130° C.

The resulting particles can be used in a number of applications such as expandable resins, ion exchange resins or applications requiring a uniform or customized particle size distribution.

However, in a further embodiment of the invention, the polymerization of the monomers in the dispersed organic liquid phase takes place in the presence of a blowing agent. The blowing agent can be incorporated in the aqueous phase or the organic liquid phase to be dispersed. If the blowing agent is in the aqueous phase it can be present in amounts of from 2.5 to 7 weight % based on the weight of the dispersed organic liquid phase. If it is introduced into the organic liquid phase to be dispersed it would be used in corresponding amounts.

In another embodiment the polymerization can be finished and the resulting resin beads are obtained and subsequently impregnated with a blowing agent. The resin beads or particles can be re-suspended in a liquid medium, such as water and the medium can additionally contain from 2.5 to 7 weight % based on the polymerized dispersed organic liquid phase (e.g. polymer beads) of a blowing agent.

The expandable resin beads can be impregnated using any conventional method with a suitable blowing agent. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g. CFC's and HCFC'S, which boil at a temperature below the softening point of the polymer chosen. Mixtures of these aliphatic hydrocarbon blowing agents can also be used.

As a non-limiting example, liquid n-pentane or iso-pentane, or any mixture of liquid n-pentane and iso-pentane, can be used to impregnate the beads. The amount of absorbed blowing agent in the beads can varied from 3% to 25%, in some cases from about 6% to 15% of the initial mass of non-impregnated beads.

Alternatively, water can be blended with these aliphatic hydrocarbons blowing agents or water can be used as the sole blowing agent as taught in U.S. Pat. Nos. 6,127,439; 6,160, 027; and 6,242,540 in these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The resin beads of the current invention may be impregnated with any of the above blowing agents and can be stored, optionally for future expansion. During storage, the blowing agent gradually evolves from the resins, the rate of which is an important consideration for further bead processing. If the rate of blowing agent loss is too high (i.e. days or weeks) the impregnated beads may have to be refrigerated to guard against premature loss of blowing agent.

In a particular embodiment of the current invention, resin beads with improved blowing agent retention times, are provided by A-1) forming a dispersion of organic droplets by pressure atomizing an organic liquid phase below the free surface of an aqueous phase, which can be stationary or flowing; or A-2) forming a dispersion of organic droplets of an organic liquid phase in an aqueous phase, which can be stationary or flowing, by applying mechanical agitation;

wherein the organic liquid phase comprises an "acrylonitrile-butadiene rubber" or an "acrylonitrile-butadiene-styrene rubber" and one or more polymerizable aryl-monomers, and B) polymerizing the monomers in the dispersed organic droplets in a low shear flow pattern to form unexpanded polymer beads.

The resin beads as formed above, have a continuous phase comprising an acrylonitrile-butadiene, or an acrylonitrile-butadiene-styrene rubber and a dispersed phase comprising homo- or co-polymers of one or more polymerizable aromatic monomer and further have the ability to retain a blowing agent for months without any additional bead treatment, such as refrigeration. This is in contrast to beads which have a continuous phase comprising butadiene rubbers (i.e. rubbers without acrylonitrile or methacrylonitrile) and a dispersed phase comprising homo- or co-polymers of one or more polymerizable aromatic monomers, which typically retain a blowing agent for not more than a few weeks.

The resin beads are optionally expanded to a bulk density of at least 0.5 lb/ft$^3$, in some cases at least 1.25 lb/ft$^3$, in other cases at least 1.5 lb/ft$^3$, in some situations at least 1.75 lb/ft$^3$, in some circumstances at least 2 lb/ft$^3$, in other circumstances at least 3 lb/ft$^3$, and in particular circumstances at least 3.25 lb/ft$^3$ or 3.5 lb/ft$^3$. Also, the bulk density can be as high as 50 lb/ft$^3$, in some situations 40 lb/ft$^3$, in some instances up to 30 lb/ft$^3$, in other instances up to 20 lb/ft$^3$, in certain situations up to 12 lb/ft$^3$, in some cases up to 10 lb/ft$^3$, and in other cases up to 5 lb/ft$^3$. The bulk density of the expanded resin beads can be any value or range between any of the values recited above.

The expansion step is conventionally carried out by heating the impregnated resin beads via any conventional heating medium, such as steam, hot air, hot water, or radiant heat. One generally accepted method for accomplishing the pre-expansion of impregnated resin beads is taught in U.S. Pat. No. 3,023,175.

The resin beads can include customary ingredients and additives, such as flame retardants, pigments, dyes, colorants, plasticizers, mold release agents, stabilizers, ultraviolet light absorbers, mold prevention agents, antioxidants, rodenticides, insect repellants, and so on. Typical pigments include, without limitation, inorganic pigments such as carbon black, graphite, expandable graphite, zinc oxide, titanium dioxide, and iron oxide, as well as organic pigments such as quinacridone reds and violets and copper phthalocyanine blues and greens.

The expanded resin beads can have an average particle size of at least 0.3, in some circumstances at least 0.5, in some cases at least 0.75, in other cases at least 0.9 and in some instances at least 1 mm and can be up to 15, in some circumstances up to 10, in other circumstances up to 6, in some cases up to 4, in other cases up to 3, and in some instances up to 2.5 mm. The average particle size of the expanded resin beads can be any value and can range between any of the values recited above. The average particle size of the expanded resin beads can be determined using laser diffraction techniques or by screening according to mesh size using mechanical separation methods well known in the art.

The expanded beads can have any density ranging from 0.6-4.0 pcf.

As discussed above, when impregnated with a blowing agent, unexpanded resin beads having a continuous phase comprising an acrylonitrile-butadiene, or an acrylonitrile-butadiene-styrene rubber and a dispersed phase comprising homo- or co-polymers of one or more polymerizable aromatic monomer, show very good blowing agent retention, as compared to other materials. By way of example, such resin beads may retain up to 75%, in some cases up to 50% of the initial blowing agent wt. % (i.e. as obtained shortly after impregnation) after 1000 hrs, in some instances after 1500 hrs of storage at room temperature and pressure. In addition, such beads may be expanded to full volume after more than 1500 hrs of storage at room temperature and pressure. By way of example, beads impregnated with 12 wt. % of a blowing agent, and left on an open tray at ambient conditions, still expanded to a full size (i.e. to the same size as beads expanded shortly after impregnation) after more than 5 months; beads impregnated with 6-8 wt. % of a blowing agent, still expanded to full size after 3 months. By the phrase "shortly after impregnation" it is meant that not more than 24 hrs have elapsed since impregnation of the beads with a blowing agent.

In an embodiment of the invention, and in order to provide expanded resin beads with desirable physical properties, the expanded polymer particles are not expanded to their maximum expansion factor; as such an extreme expansion yields particles with undesirably thin cell walls and insufficient toughness and strength. As such, the resin beads can be expanded at least 5%, in some cases at least 10%, and in other cases at least 15% of their maximum expansion factor. However, so as not to cause the cell wall thickness to be too thin, the resin beads are expanded up to 80%, in some cases up to 75%, in other cases up to 70%, in some instances up to 65%, in other instances up to 60%, in some circumstances up to 55%, and in other circumstances up to 50% of their maximum expansion factor. The resin beads can be expanded to any degree indicated above or the expansion can range between any of the values recited above.

The expandable resin beads obtained according to the invention can be formed into a foamed shaped article of a desired configuration by pre-foaming the beads and foaming and shaping them in a mold cavity. The resulting foamed shaped article has superior thermal stability, chemical resistance (e.g., oil resistance), toughness, and flexural strength due to the elastomeric continuous phase.

Without wishing to be bound by theory, it is believed that a continuous elastomeric morphology improves properties of the expanded bead, because a continuous rubber network will stretch during bead expansion, adding strength and elasticity to the polystyrene matrix. The expanded resin beads of the current invention, contrast with conventional expanded high impact polystyrene (HIPS) in which the rubber component is distributed as discrete particles within a polystyrene matrix. In conventional expanded HIPS, the elastomeric particles are not forced to stretch and only marginally participate in the bead expansion process.

In particular, the foamed article can be used as a packaging material, an underlayer of a roofing material, or a container because when it is subject to high temperatures, it does not shrink or softened due to exposure to heat, and, therefore, it finds extensive use as a heat or sound insulating material or a cushioning material.

The present invention will further be described by reference to the following examples. The following examples are merely illustrative of the invention and are not intended to be limiting. Unless otherwise indicated, all percentages are by weight.

EXAMPLES

Example 1

This example demonstrates a method of making the resin beads according to the invention. An organic liquid phase was prepared by dissolving 10 wt. % of a medium cis DIENE® 55AC10 polybutadiene rubber available from Firestone Polymers, Akron Ohio in 90 wt. % styrene monomer. An aqueous phase was prepared by dissolving 2 wt. % poly diallyl dimethyl ammonium chloride (PDAC, available from Sigma-Aldrich Corp., St. Louis, Mo.) and 3 wt. % poly vinyl alcohol (GOSHENOL™ GH-23 available from Nippon Gohsei (UK) Limited, Kingston upon Hull, UK).

The polymerization was carried out in an apparatus as described in Example 1 of U.S. Pat. No. 6,610,798. About 5 liters of aqueous phase was added to the reactor. Benzoyl peroxide (0.5 parts per 100 parts styrene) was added to the organic liquid phase, which was subsequently fed to the reactor via a transportation, where it was heated to 80° C. Downstream of the heated line, the organic phase was subjected to pressure pulsation imposed with a frequency of 45 Hz. The pulsating flow of the organic phase entered the atomizer located in the bottom portion of the reactor at a flow rate of about 1.3 ml/s. Approximately 1.5 liters of organic phase was dispersed as monosized droplets in the aqueous phase. Nitrogen was bubbled through the reactor to create a low shear flow pattern distributing and suspending the droplets. The reactor contents were heated to 90° C. and maintained at that temperature for six hours, after which time the resulting resin beads were recovered.

The polymer in the resin beads had a Mw of about 80,000, unreacted styrene monomer level of 1.5 wt. % based on the weight of the bead and did not melt or decompose after being exposed to a temperature of 250° C. for ten minutes. The amount of crosslinking in the beads was determined to be about 65%-83% as measured by the following two methods.

The first method calculates the percentage of crosslinking/insoluble fraction in the sample based on the measured concentration of soluble fraction dissolved in tetrachloroethylene at 60° C. and filtered through a 450 nm syringe. The concentration is determined using Fourier Transform Infrared Spectroscopy (FTIR).

The second method was a modified xylene extraction method where the percentage of crosslinking/insoluble fraction in the sample is estimated according to a modified ASTM D2765-01: "Standard Test Methods for Determination of Gel Content and Swell Ratio of Crosslinked Ethylene Plastics", Test Method A. The modifications used were: 1 g sample (instead of 0.3 g); xylene reflux for 6 hours (instead of 12 hours); and the samples were not ground nor sieved FIG. 1A is a transmission electron microscope (TEM) image showing the crosslinked web morphology of the resin beads. The lighter areas are discrete particulate domains of polystyrene and the darker areas are the three-dimensional network structure of the rubber.

Figure 1B:
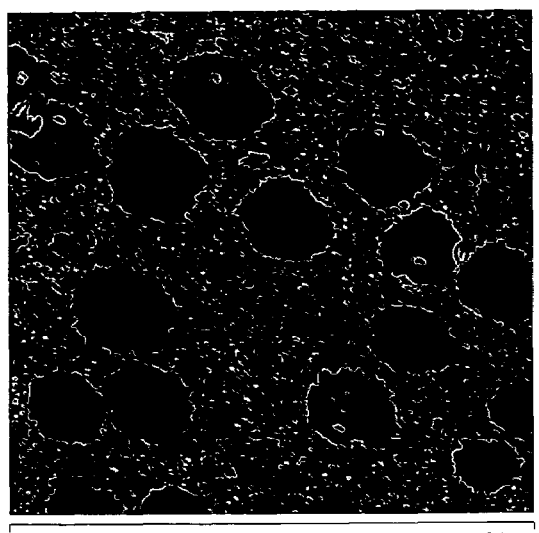
FIGS. 1B and 1C are atomic force microscopy (AFM) images of a resin bead according to the invention.
Figure 1C:
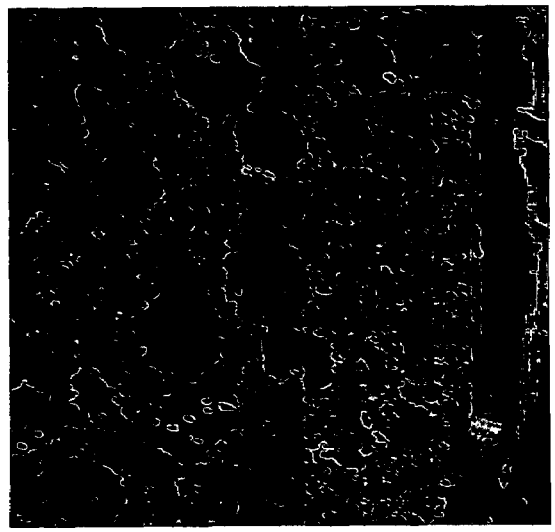

FIGS. 1B and 1C are atomic force microscopy (AFM) images showing the crosslinked web morphology of the resin beads. The lighter areas are discrete particulate domains of polystyrene and the darker areas are the three-dimensional network structure of the rubber. FIG. 1C particularly shows an approximately 3 µm outer skin of the resin bead.

Example 2

Figure 2:
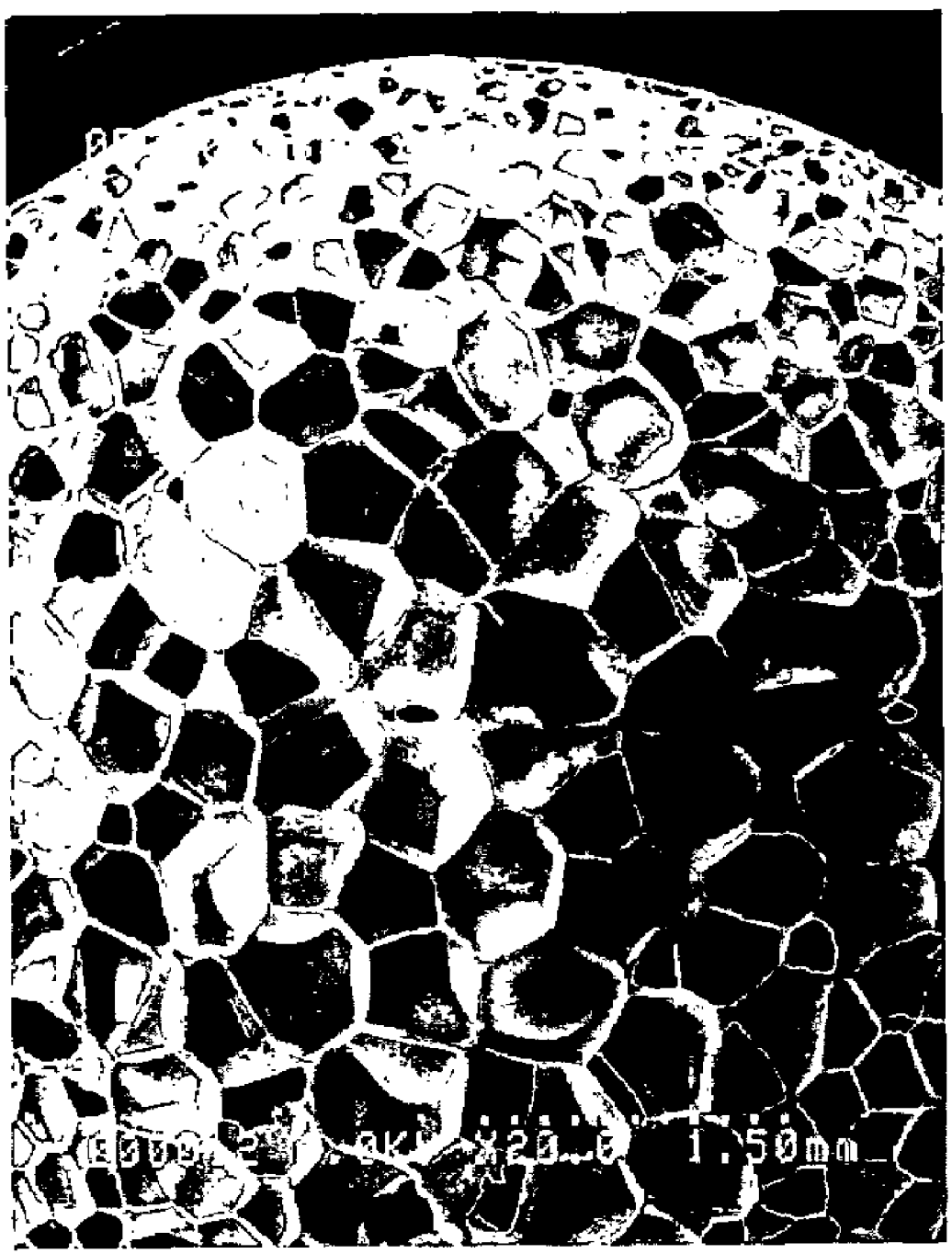
FIGS. 2 and 3 are scanning electron micrograph (SEM) images of expanded beads prepared according to the invention.
Figure 3:

A sample of beads from Example 1 were impregnated with a blowing agent (n-pentane, iso-pentane and 50/50 w/w mixture of n-pentane and iso-pentane) such that the blowing agent made up about 16 wt. % of the impregnated resin bead. The impregnated beads were then expanded using steam at 95° C. for from 1 minute to 28 minutes. The beads formed spherical foamed particles that did not deform or decrease in volume when exposed to the longer steam times. The beads were relatively insensitive to steaming times. The beads expanded to about 5 times the diameter of the unexpanded bead after 1 minute of steam treatment. For comparison, steam treatment lasting 7 minutes gave only slightly larger diameters in the expanded beads (up to about 10% larger diameter). After prolonged steaming times (i.e. 7 minutes), the beads still had a smooth surface and good cell structure. The beads did not shrink or "burn" as other materials do when they are exposed to steam for long periods of time. FIGS. 2 and 3 show 20× and 100× scanning electron micrograph (SEM) images respectively of beads expanded for 8 minutes using a 50/50 v/v mixture of iso-pentane and n-pentane as blowing agent.

Example 3

This example demonstrates making the resin beads according to the present invention using a low shear flow pattern generated by mechanical agitation. An aqueous phase was prepared containing 2 wt. % PDAC and 0.5 wt. % poly vinyl alcohol in water. An organic liquid phase was prepared by dissolving 10 wt. % of DIENE® 55AC10 polybutadiene rubber in 90 wt. % styrene monomer. Approximately 1 liter of aqueous phase was added to a reactor having an agitator. About 0.18 liters of the organic liquid phase was mixed with benzoyl peroxide (0.5 parts per 100 parts of styrene) and the combination was added to the aqueous phase and agitation was applied at 150 rpm to form a dispersion of discrete organic droplets. The dispersion was heated to 90° C. This temperature was maintained for four hours and was then increased to 95° C. and maintained there for two hours. The resin beads were then recovered from the reactor.

Figure 4A:
FIGS. 4A and 4B are AFM images of a resin bead according to the invention.
Figure 4B:
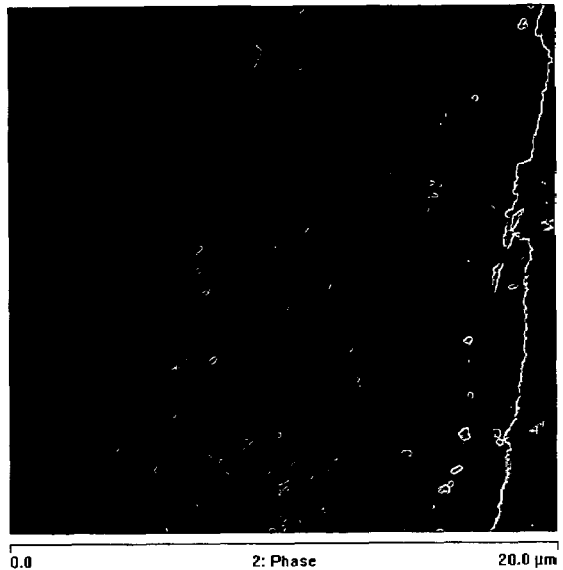

FIGS. 4A and 4B are AFM images showing the crosslinked web morphology of the resin beads. The lighter areas are discrete particulate domains of polystyrene and the darker areas are the three-dimensional network structure of the rubber. FIG. 4B particularly shows an approximately 3 µm outer skin of the resin bead.

Example 4

This example demonstrates making the resin beads with extended (improved) blowing agent retention, according to the present invention, using a low shear flow pattern generated by mechanical agitation. An aqueous phase was prepared containing 2 wt. % PDAC and 0.08 wt. % poly vinyl alcohol in water. An organic liquid phase was prepared by dissolving A) 7% wt, B) 10 wt. % and C) 15 wt. % of acrylonitrile-butadiene rubber 3965F (available from Lanxess) in, respectively, A) 93 wt. % B) 90% wt and C) 85 wt. % of styrene monomer. Approximate 700 g of aqueous phase was added to a reactor having an agitator. About 500 g of the organic liquid phase was mixed with benzoyl peroxide (0.5 parts per 100 parts of styrene) and with t-amylperoxy 2-ethylhexyl carbonate Luperox (TAEC) used as the secondary peroxide in the amount of 0.2 parts per 100 parts of styrene. This combination was added to the aqueous phase and agitation was applied at 185 rpm to form a dispersion of discrete organic droplets. The dispersion was heated to 90° C. and this temperature was maintained for four hours and then increased to 93° C. and maintained there for additional two hours. Next, to further progress of polymerization and to lower the residual styrene level in the beads to several hundred ppm, (<1000 ppm), a "finishing step" was carried out: the entire reactor content (dispersed organic and aqueous phases) was heated to 120° C. (this was the temperature when the secondary peroxide TAEC becomes active) and kept for 4 hrs. Reactor was cool down and the resin beads were then recovered.

Figures 5A, 5B, 5C:
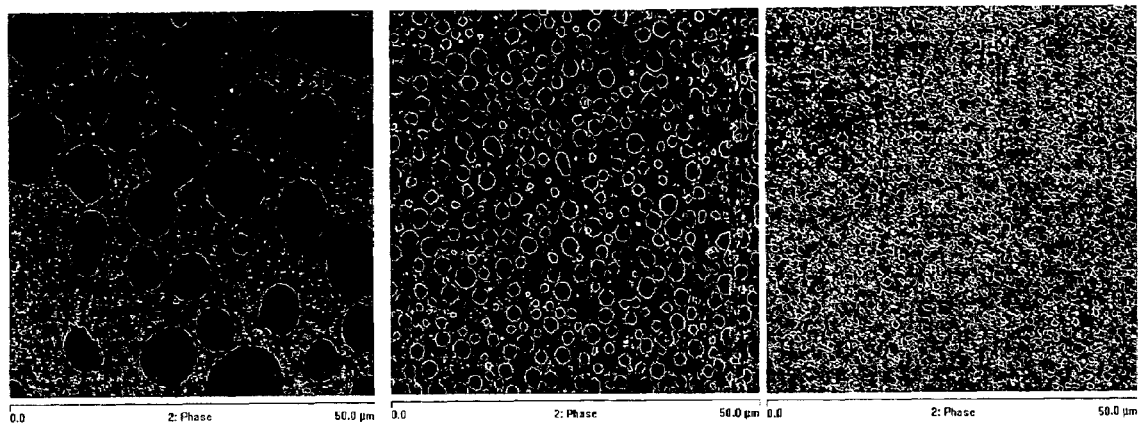
FIGS. 5A, 5B and 5C are the AFM images of unexpanded resin beads according to the invention.

FIGS. 5A, 5B and 5C are AFM images showing the crosslinked web morphology of the resin beads modified with 7%, 10% and 15% of nitrile rubber, respectively. The lighter areas are discrete particulate domains of polystyrene and the darker areas are the three-dimensional network structure of the rubber. It shows that the size of polystyrene domains decreases with the higher concentration of dissolved rubber.

Figure 6:
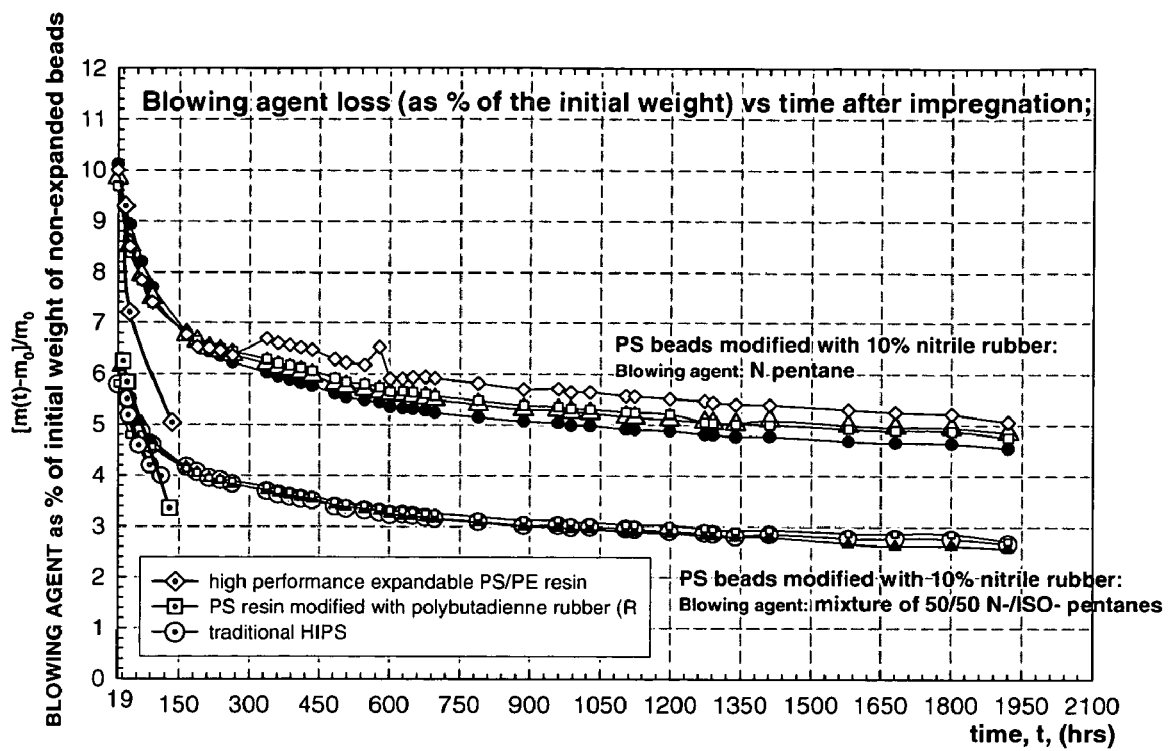
FIG. 6 shows the blowing agent retention of impregnated beads which were prepared according to the invention.

The beads containing 10% of nitrile rubber were further impregnated by immersing them for 60 hrs in liquid blowing agents at ambient conditions. Some beads were immersed in n-pentane while some of the beads were immersed in a mixture comprising a 50:50 wt. % mixture of n-pentane and iso-pentane. After impregnation, the beads were analyzed for the intake of blowing agents, to establish an initial wt. % of blowing agent in the beads. The beads were then left on a tray under atmospheric pressure and temperature. The level of blowing agents remaining in the beads was monitored over the course of several months. The results showing the blowing agent retention in the nitrile rubber modified beads impregnated with n-pentane and with a 50/50 mixture of n-pentane and iso-pentane are shown in FIG. 6. The data in FIG. 6, shows that the beads retained the blowing agents very well, loosing only about 50% of the blowing agent in the first 1500-2000 hrs. In addition, there is no visible difference in the volume of resin beads that were expanded after >1500 hrs, relative to beads that were expanded (in 96° C. steam) shortly after impregnation (i.e. after 24 hrs). In each case, the resin beads could be expanded to full size, increasing their diameter 4 to more than 5 times (depending on the type of blowing agent used) relative to the unexpanded bead. These expansions correspond to volume increases of about 64 to 125 times that of the unexpanded beads.

For comparison, data showing pentane retention for several other types of expandable polystyrene beads, such as a PS/PE resin, a polystyrene modified with butadiene rubber and a traditional HIPS is also provided in FIG. 6.

Example 5

Figure 7:
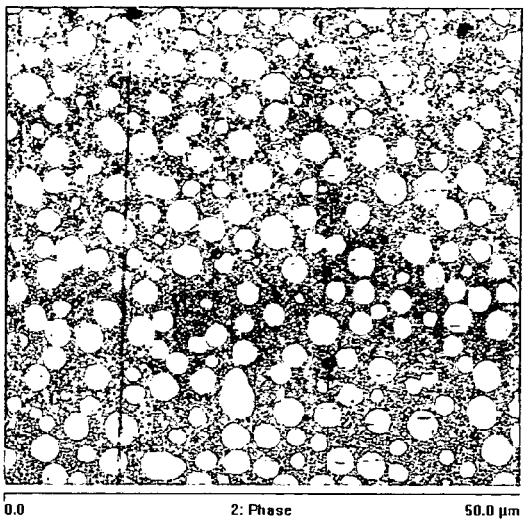
FIG. 7. shows AFM images of unexpanded resin beads resulting from polymerization at a different agitator speeds which were prepared according to the invention.
Figure 7:
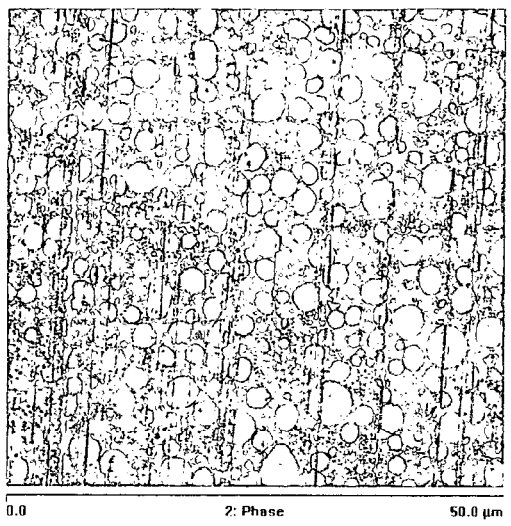
Figure 7:
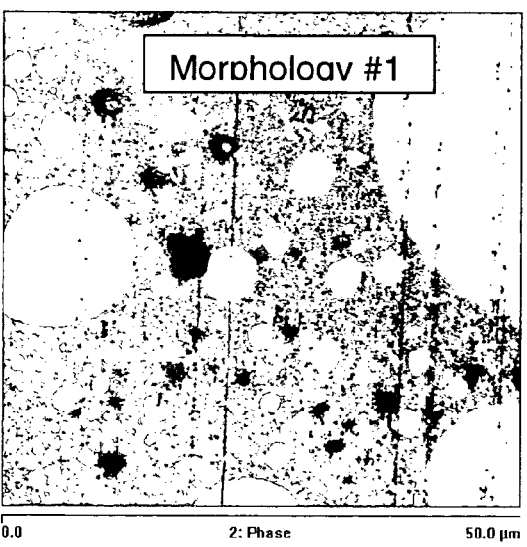
Figure 7:
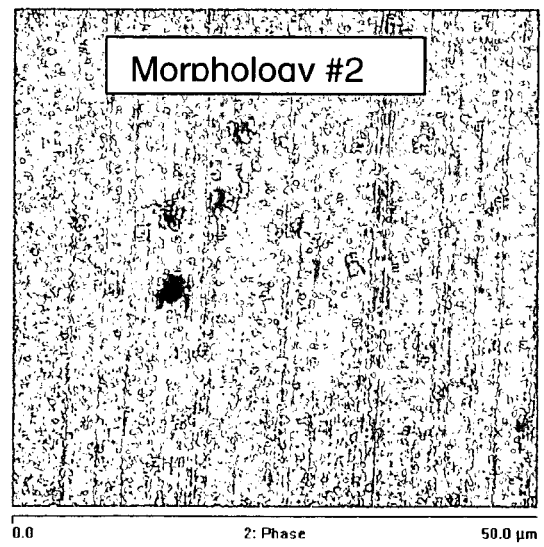

This example demonstrates the effect of a flow pattern (specifically—shear rate and turbulence level) maintained during the polymerization process on the morphology of the polystyrene beads comprising 10 wt. % of nitrile rubber. The three polymerization processes were carried out using the same recipe and the same set of operational conditions in a tank equipped with a mechanical agitator. Each time, however, polymerization was carried at a different agitator speed. The resulting bead morphologies are shown in FIG. 7. The beads polymerized in the first two processes, carried out at 135 rpm and 280 rpm respectively, had similar morphology: the morphology comprises a continuous network of rubber (darker areas) with regular small discrete polystyrene occlusions (lighter areas). However, beads which were polymerized in a third batch, using the highest agitation speed of 600 rpm, and accordingly, the highest turbulence and shear levels, had a non-uniform morphology across the batch and displayed two different types of morphology: some beads, with morphology #1, had a continuous rubber network but occlusions of polystyrene were very large and not regular; other beads had morphology #2, where there are no distinctive polystyrene occlusions and it is generally difficult to differentiate rubber from polystyrene. This example shows that the level of turbulence and shear stress during the polymerization process can affect the bead morphology and may result in different types of morphology in the individual beads from the same batch.

Example 6

Prior Art

Figure 8:
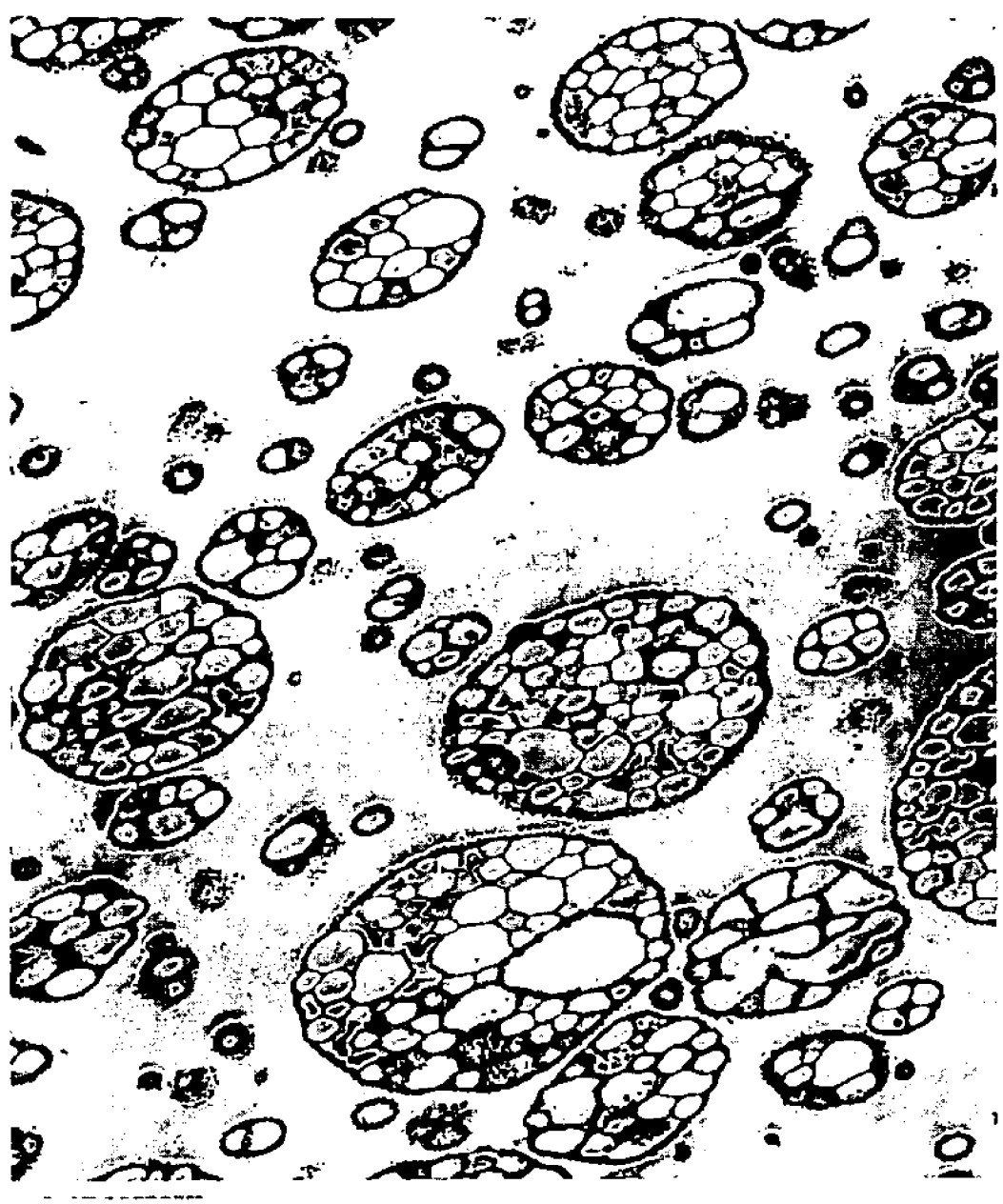
FIG. 8 shows a TEM image of a HIPS resin bead prepared according to the prior art.

This example demonstrates the morphology of traditional HIPS resin beads using established high shear flow patterns generated by mechanical agitation. FIG. 8 is a TEM image showing the typical HIPS morphology in a STYROSUN® (NOVA chemicals Inc., Pittsburgh, Pa.) resin bead prepared using art recognized high shear dispersion polymerization processing. The light area is a continuous phase of polystyrene and the darker, generally spherical areas are rubber particles.

The data demonstrate the unique morphology of the present resin beads compared to that of known HIPS resin beads.

The present invention has been described with reference to specific details of particular embodiments thereof. It is not intended that such details be regarded as limitations upon the scope of the invention except insofar as and to the extent that they are included in the accompanying claims.

We claim:

1. An unexpanded resin bead having an average particle size of from 0.001 mm to 10 mm and comprising a continuous phase and a particulate dispersed phase, wherein
    the continuous phase comprises one or more elastomeric polymers, and
    the dispersed phase comprises one or more homopolymers and/or copolymers containing repeat units resulting from the polymerization of one or more aryl polymerizable monomers; and
    wherein the resin bead comprises a skin covering an outer surface of the resin bead; and
    wherein the skin comprises the homopolymers and/or copolymers of the dispersed phase.

2. The resin bead according to claim 1, wherein the particulate dispersed phase comprises particles having an aspect ratio of from 1 to 10.

3. The resin bead according to claim 1, wherein the particulate dispersed phase comprises particles having a circular, oval or elliptical cross-section shape.

4. The resin bead according to claim 1, wherein the continuous phase has a crosslinked web morphology.

5. The resin bead according to claim 1, wherein the elastomeric polymers are copolymers comprising repeat units from the polymerization of one or more conjugated diene and at least one unsaturated nitrile selected from the group consisting of acrylonitrile and methacrylonitrile.

6. The resin bead according to claim 5, wherein the elastomeric polymers are copolymers further comprising repeat units from the polymerization of one or more aryl monomers selected from the group consisting of styrene, p-methyl styrene, α-methyl styrene, tertiary butyl styrene and dimethylstyrene.

7. The resin bead according to claim 5, wherein the elastomeric polymers are partially hydrogenated.

8. The resin bead according to claim 6, wherein the elastomeric polymers are partially hydrogenated.

9. The resin bead according to claim 1, wherein the weight average molecular weight of the one or more elastomeric polymers is from about 6,000 to about 500,000.

10. The resin bead according to claim 1, wherein the elastomeric polymers are crosslinked.

11. The resin bead according to claim 10, wherein from about 5% to about 95% of the elastomeric polymers are crosslinked.

12. The resin bead according to claim 1, wherein the aryl monomers are selected from the group consisting of styrene, p-methyl styrene, α-methyl styrene, tertiary butyl styrene, dimethyl styrene, nuclear brominated or chlorinated derivatives thereof and combinations thereof.

13. The resin bead according to claim 1, wherein the copolymers in the dispersed phase contain repeat units resulting from the polymerization of one or more aryl polymerizable monomers with one or more monomers selected from the group consisting of maleic anhydride, maleic acid, maleimide, fumaric acid, $C_1$-$C_{12}$ linear, branched or cyclic alkyl esters of maleic acid, $C_1$-$C_{12}$ linear, branched or cyclic alkyl esters of fumaric acid, itaconic acid, $C_1$-$C_{12}$ linear, branched or cyclic alkyl esters of itaconic acid, itaconic anhydride, ethylene, propylene, 1-butene, isobutylene, 2-butene, diisobutylene, 1-pentene, 2-pentene, 1-hexene, 2-hexene, 3-hexene, vinyl acetate, $C_1$-$C_{12}$ linear, branched or cyclic alkyl esters of (meth)acrylic acid, acrylonitrile, methacrylonitrile, and combinations thereof.

14. The resin bead according to claim 1, wherein the weight average molecular weight of the one or more homopolymers and/or copolymers containing repeat units resulting from the polymerization of one or more aryl polymerizable monomers is from about 10,000 to about 1,000,000.

15. The resin bead according to claim 1 containing unreacted monomers at a level of less than 5 wt. % of the resin bead.

16. The resin bead according to claim 1 further comprising a blowing agent.

17. The resin bead according to claim 16 wherein the blowing agent is selected from the group consisting of nitrogen, sulfur hexafluoride ($SF_6$), argon, carbon dioxide, 1,1,1,2-tetrafluoroethane (HFC-134a), 1,1,2,2-tetrafluoroethane (HFC-134), 1,1,1,3,3-pentafluoropropane, difluoromethane (HFC-32), 1,1-difluoroethane (HFC-152a), pentafluoroethane (HFC125), fluoroethane (HFC161) and 1,1,1-trifluoroethane (HFC-143a), methane, ethane, propane, n-butane, isobutane, n-pentane, isopentane, cyclopentane, neopentane, hexane, azodicarbonamide, azodiisobutyro-nitrile, benzenesulfonylhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, trihydrazino triazine, mixtures of citric acid and sodium bicarbonate, and combinations thereof.

18. The resin bead according to claim 1 having an aspect ratio of less than 10.

19. The resin bead according to claim 1, wherein the skin is from 0.1 to 7 μm thick.

20. Molded articles comprising the resin beads according to claim 16.

* * * * *